United States Patent
Tawara et al.

(10) Patent No.: US 8,308,560 B2
(45) Date of Patent: Nov. 13, 2012

(54) NETWORK SYSTEM, INFORMATION PROCESSING APPARATUS AND INFORMATION PROCESSING PROGRAM

(75) Inventors: Masaki Tawara, Kyoto (JP); Yurie Hattori, Kyoto (JP); Ichirou Mihara, Tokyo (JP)

(73) Assignees: Nintendo Co., Ltd., Kyoto (JP); Arika Co., Ltd., Tokyo (JP)

( * ) Notice: Subject to any disclaimer, the term of this patent is extended or adjusted under 35 U.S.C. 154(b) by 418 days.

(21) Appl. No.: 12/564,407

(22) Filed: Sep. 22, 2009

(65) Prior Publication Data
US 2010/0285873 A1 Nov. 11, 2010

(30) Foreign Application Priority Data
May 8, 2009 (JP) ................... 2009-113685

(51) Int. Cl.
*A63F 13/00* (2006.01)
*A63F 9/24* (2006.01)
(52) U.S. Cl. .......................... 463/31; 463/42
(58) Field of Classification Search ............ 463/31, 463/42; 715/706, 758
See application file for complete search history.

(56) References Cited

U.S. PATENT DOCUMENTS

| | | | |
|---|---|---|---|
| 6,200,138 B1 * | 3/2001 | Ando et al. .................. 434/61 |
| 6,267,674 B1 * | 7/2001 | Kondo et al. ................ 463/32 |
| 6,431,982 B2 * | 8/2002 | Kobayashi ................... 463/4 |
| 6,912,293 B1 * | 6/2005 | Korobkin .................... 382/100 |
| 7,006,616 B1 * | 2/2006 | Christofferson et al. 379/202.01 |
| 7,491,123 B2 * | 2/2009 | Smith .......................... 463/35 |
| 7,503,006 B2 * | 3/2009 | Danieli ........................ 715/751 |
| 7,840,668 B1 * | 11/2010 | Sylvain et al. ............... 709/224 |
| 2002/0098885 A1 * | 7/2002 | Sakaguchi .................. 463/31 |
| 2005/0075885 A1 * | 4/2005 | Danieli ........................ 704/276 |
| 2005/0245317 A1 * | 11/2005 | Arthur et al. ............... 463/42 |
| 2006/0025216 A1 * | 2/2006 | Smith .......................... 463/35 |

(Continued)

FOREIGN PATENT DOCUMENTS
JP 2003-304350 10/2003

OTHER PUBLICATIONS

The computer game Counter Strike Source, as evidenced by the document css_archive.pdf, downloaded from http://web.archive.org/web/20070829153201/whisper.ausgamers.com/wiki/index.php/Introduction_to_Counter-Strike, with an archive.org verified date of Aug. 29, 2007. published by Valve corp.*

(Continued)

*Primary Examiner* — Peter DungBa Vo
*Assistant Examiner* — Nicholas DiToro
(74) *Attorney, Agent, or Firm* — Nixon & Vanderhye P.C.

(57) ABSTRACT

A network system includes a plurality of information processing apparatuses. Each information processing apparatus arranges an own character and a partner character within a virtual space, and outputs an image of the virtual space on a monitor when a message is transmitted and received from the information processing apparatus of a chatting partner. Furthermore, an index indicating a direction from the own character to the partner character is generated, and it is determined whether or not the partner character is included in a predetermined range defined within the virtual space, and it is determined whether or not a message is being transmitted or received. When the partner character is out of the predetermined range, and the message is being transmitted or received, the index is output to the monitor.

13 Claims, 18 Drawing Sheets

U.S. PATENT DOCUMENTS

2006/0104458 A1* 5/2006 Kenoyer et al. .................. 381/92
2009/0034712 A1* 2/2009 Grasley et al. ........... 379/406.01

OTHER PUBLICATIONS

The computer game Halo3, as evidenced by the document Halo-HUD-achive.pdf downloaded from http://web.archive.org/web/20080518153456/http://halowiki.net/p/Heads_Up_Display , with an archive.org verified date of May 18, 2008, published by Microsoft Game Studios.*

The computer game Silent Hill released Sep. 30, 2008 by Double Helix Games, as evidenced by the web page http://wikicheats.gametrailers.com/Silent_Hill:_Homecoming_-_PC_PS3_XB360/Walkthrough, download on May 14, 2012.*

* cited by examiner

EXAMPLE OF VISUAL FIELD RANGE IN VIRTUAL SPACE :
HEMISPHERE EXTENDING IN FRONT OF OWN CHARACTER A
(ARROW DIRECTION)

ously grasp which direction the partner character is with ease. The speech, here, includes at least one of a message transmission (voice chat) by voices and a word transmission by words (word chat).

NETWORK SYSTEM, INFORMATION PROCESSING APPARATUS AND INFORMATION PROCESSING PROGRAM

CROSS REFERENCE OF RELATED APPLICATION

The disclosure of Japanese Patent Application No. 2009-113685 is incorporated herein by reference.

BACKGROUND OF THE INVENTION

1. Field of the Invention

The present invention relates to a network system, an information processing apparatus, and an information processing program. More specifically, the present invention relates to a network system, an information processing apparatus and an information processing program which hold chat over a network.

2. Description of the Related Art

As a conventional background art of such a kind, a chat system disclosed in Japanese Patent Application Laid-Open No. 2003-304350 is known. In this background art, an arrow is put above a head of an object (partner character) representing a transmitter and a receiver (partner with whom chat is done).

However, in the above-described background art, if the objects representing the transmitter and the receiver extend off the screen, the arrows for identifying them also disappear, so that the user cannot understand which direction the chatting partner is.

SUMMARY OF THE INVENTION

Therefore, it is a primary object of the present invention to provide a novel network system, information processing apparatus and information processing program.

Another object of the present invention is to provide a network system, an information processing apparatus and an information processing program which allow a user to inform which direction a character corresponding to the chatting partner is.

This invention adopts configurations below in order to solve the aforementioned problems.

A first invention is a network system doing chat among a plurality of information processing apparatuses via a network, and each information processing apparatus comprises a chatting partner specifying means for specifying an information processing apparatus of a partner with which chat is done, a message transmitting and receiving means for transmitting and receiving a message between an own information processing apparatus and the information processing apparatus of the partner specified by the chatting partner specifying means, a character arranging means for arranging an own character corresponding to the own information processing apparatus and a partner character corresponding to the information processing apparatus of the partner within a virtual space, an image generating means for generating an image obtained by seeing the virtual space from an arbitrary position, a direction calculating means for calculating a direction from the own character to the partner character, an index generating means for generating an index such that it indicates the direction calculated by the direction calculating means, a partner character determining means for determining whether or not the partner character is included in a predetermined range defined within the virtual space, a transmission and reception determining means for determining whether or not a message is being transmitted or received by the message transmitting and receiving means, and a display outputting means for outputting the image generated by the image generating means to a display means, and the display outputting means outputs the index generated by the index generating means to the display means in a predetermined manner when the partner character determining means determines that the partner character is not included in the predetermined range, and the transmission and reception determining means determines that a message is being transmitted or received.

In a network system according to the first invention, chat is done among the plurality of information processing apparatuses via a network. Each information processing apparatus comprises a chatting partner specifying means, a message transmitting and receiving means, a character arranging means, an image generating means, a direction calculating means, an index generating means, a partner character determining means, a transmission and reception determining means and a display outputting means. The chatting partner specifying means specifies an information processing apparatus of a partner with which chat is done. The message transmitting and receiving means transmits and receives a message between an own information processing apparatus and the information processing apparatus of the partner specified by the chatting partner specifying means. The character arranging means arranges an own character corresponding to the own information processing apparatus and a partner character corresponding to the information processing apparatus of the partner within a virtual space. The image generating means generates an image obtained by seeing the virtual space from an arbitrary position. The direction calculating means calculates a direction from the own character to the partner character. The index generating means generates an index such that it indicates the direction calculated by the direction calculating means. The partner character determining means determines whether or not the partner character is included in a predetermined range defined within the virtual space. The transmission and reception determining means determines whether or not a message is being transmitted or received by the message transmitting and receiving means. The display outputting means outputs the image generated by the image generating means to a display means. The display outputting means outputs the index generated by the index generating means to the display means in a predetermined manner when the partner character determining means determines that the partner character is not included in the predetermined range, and the transmission and reception determining means determines that a message is being transmitted or received.

According to the first invention, when a character corresponding to the chatting partner makes a speech out of the predetermined range, the direction toward this partner character is shown by the index in a predetermined manner, and therefore, even if the partner character extends off the screen, the user can visually grasp which direction the partner character is with ease. The speech, here, includes at least one of a message transmission (voice chat) by voices and a word transmission by words (word chat).

A second invention is a network system according to the first invention, and the index generating means generates the index in a first manner when the partner character determining means determines that the partner character is not included in the predetermined range, and the transmission and reception determining means determines that a message is not being transmitted or received, and generates the index in a second manner when the partner character determining means determines that the partner character is not included in the predetermined range, and the transmission and reception determining means determine that a message is being transmitted or received.

According to the second invention, when the character corresponding to the chatting partner is out of the predetermined range, even if the partner is not making a speech, an index is generated, so that the user can always grasp which direction the partner character is. In addition, the manner of the index is changed depending on whether or not the partner is making a speech, so that the user can easily grasp whether the partner is making a speech.

A third invention is a network system according to the first or the second invention, and the message is audio data, the transmission and reception determining means determines that a message is being transmitted or received when a volume of the audio data transmitted or received by the message transmitting and receiving means is equal to or more than a predetermined value, and determines that a message is not being transmitted or received when a volume of the audio data transmitted or received by the message transmitting and receiving means is less than the predetermined value.

According to the third invention, the message is a voice, and when the volume is equal to or more than the predetermined value, it is determined that a message is being transmitted or received while when the volume is less than the predetermined value, it is determined that a message is not being transmitted or received, sot that the user can enjoy more interesting chatting by a voice. Furthermore, it is possible to easily inform whether or not the volume of the voice is equal to or more than the predetermined value, and this makes it possible to prompt the user to speak with a loud voice.

A fourth invention is a network system according to any one of the first to the third inventions, and each of the information processing apparatus further comprises a sphere generating means for generating a sphere centered at the own character with a predetermined size, the direction calculating means generates a line connecting the own character and the partner character, and the index generating means generates the index at an intersection point of a surface of the sphere and the line.

In the fourth invention, each information processing apparatus further comprises a sphere generating means. The sphere generating means generates a sphere centered at the own character with a predetermined size, and the direction calculating means generates a line connecting the own character and the partner character, and the index generating means generates the index at an intersection point of a surface of the sphere and the line.

According to the fourth invention, the index is generated at the intersection point of the sphere and the line segment, and therefore, it is possible to show the direction on the basis of a positional relationship between the own character and the index. Furthermore, even if the index indicates either direction, it is displayed at positions having the same distance from the own character, so that the user can more easily grasp the position of the index.

A fifth invention is a network system according to any one of the first to fourth inventions, and each of the information processing apparatus further comprises a distance calculating means for calculating a distance between the own character and the partner character, and the index generating means changes the manner of the index on the basis of the distance calculated by the distance calculating means.

In the fifth invention, each information processing apparatus further comprises a distance calculating means. The distance calculating means calculates a distance between the own character and the partner character, and the index generating means changes the manner of the index on the basis of the distance calculated by the distance calculating means. The manner, here, includes a shape, a color, a size, brightness, shades of color, a blinking cycle, etc., and at least one of them is an object to be changed.

According to the fifth invention, depending on distance between the own character and the partner character, a manner of the index is changed, so that it is possible to visually grasp the distance between them with ease.

A sixth invention is a network system according to the fifth invention, and the manner includes a size.

According to the sixth invention, by changing at least a size of the index, it is possible to intuitively grasp the distance.

A seventh invention is a network system according to the sixth invention, and the index generating means generates the index so as to be larger in proportion to the distance.

According to the seventh invention, the size of the index is in proportion to the distance, so that it is possible to accurately grasp the distance.

An eighth invention is a network system according to any one of the sixth to seventh inventions, and a maximum value and a minimum value of the size are set to the index, and the index generating means generates an index of a size corresponding to the maximum value if the distance is equal to or more than a first set value, and generates an index of a size corresponding to the minimum value if the distance is equal to or less than a second set value.

According to the eighth invention, by putting restrictions, such as a maximum value, a minimum value, etc. on the size of the index, it is possible to display the index of a proper size, and maintain good viewability.

A ninth invention is a network system according to any one of the first to eighth inventions, and the index generating means generates an index having a shape indicating the direction calculated by the direction calculating means.

According to the ninth invention, the direction is indicated by the shape of the index, and therefore, it is possible to visually grasp which direction the character corresponding to the chatting partner is irrespective of the position of the index. In other words, the degree of freedom of the position of the index increases.

A tenth invention is a network system according to any one of the first to ninth inventions, and the index generating means generates an index at a position indicating the direction calculated by the direction calculating means.

According to the tenth invention, the direction is indicated by the position of the index, and therefore, it is possible to visually grasp which direction the character corresponding to the chatting partner is irrespective of the shape of the index. In other words, the degree of freedom of the shape of the index increases. It should be noted that if the direction is indicated by both of the shape and position, this makes it easy to visually grasp the direction.

An eleventh invention is an information processing apparatus for doing chat via a network, and comprises a chatting partner specifying means for specifying an information processing apparatus of a partner with which chat is done, a message transmitting and receiving means for transmitting and receiving a message between an own information processing apparatus and the information processing apparatus of the partner specified by the chatting partner specifying means, a character arranging means for arranging an own character corresponding to the own information processing apparatus and a partner character corresponding to the information processing apparatus of the partner within a virtual space, an image generating means for generating an image obtained by seeing the virtual space from an arbitrary position, a direction calculating means for calculating a direction from the own character to the partner character, an index generating means for generating an index such that it indicates the direction calculated by the direction calculating means, a partner character determining means for determining whether or not the partner character is included in a predetermined range defined within the virtual space, a transmission and reception determining means for determining whether or not a message is being transmitted or received by the message transmitting and receiving means, and a display outputting means for outputting the image generated by the image generating means to a display means, and the display outputting means outputs the index generated by the index generating means to the display means in a predetermined manner when the partner character determining means determines that the partner character is not included in the predetermined range, and the transmission and reception determining means determines that a message is being transmitted or received.

A twelfth invention causes a computer of an information processing apparatus doing chat via a network to function as a chatting partner specifying means for specifying an information processing apparatus of a partner with which chat is done, a message transmitting and receiving means for transmitting and receiving a message between an own information processing apparatus and the information processing apparatus of the partner specified by the chatting partner specifying means, a character arranging means for arranging an own character corresponding to the own information processing apparatus and a partner character corresponding to the information processing apparatus of the partner within a virtual space, an image generating means for generating an image obtained by seeing the virtual space from an arbitrary position, a direction calculating means for calculating a direction from the own character to the partner character, an index generating means for generating an index such that it indicates the direction calculated by the direction calculating means, a partner character determining means for determining whether or not the partner character is included in a predetermined range defined within the virtual space, a transmission and reception determining means for determining whether or not a message is being transmitted or received by the message transmitting and receiving means and a display outputting means for outputting the image generated by the image generating means to a display means, and the display outputting means outputs the index generated by the index generating means to the display means in a predetermined manner when the partner character determining means determines that the partner character is not included in the predetermined range, and the transmission and reception determining means determines that a message is being transmitted or received.

A thirteenth invention is a method of doing chat via a network by utilizing an information processing apparatus, and includes a chatting partner specifying step for specifying an information processing apparatus of a partner with which chat is done, a message transmitting and receiving step for transmitting and receiving a message between an own information processing apparatus and the information processing apparatus of the partner specified by the chatting partner specifying step, a character arranging step for arranging an own character corresponding to the own information processing apparatus and a partner character corresponding to the information processing apparatus of the partner within a virtual space, an image generating step for generating an image obtained by seeing the virtual space from an arbitrary position, a direction calculating step for calculating a direction from the own character to the partner character, an index generating step for generating an index such that it indicates the direction calculated by the direction calculating step, a partner character determining step for determining whether or not the partner character is included in a predetermined range defined within the virtual space, a transmission and reception determining step for determining whether or not a message is being transmitted or received by the message transmitting and receiving step, and a display outputting step for outputting the image generated by the image generating step to a display means, and the display outputting step outputs the index generated by the index generating step to the display means in a predetermined manner when the partner character determining step determines that the partner character is not included in the predetermined range, and the transmission and reception determining step determines that a message is being transmitted or received.

In the eleventh, twelfth or thirteenth invention as well, similar to the first invention, even if the partner character extends off the screen, the user can visually grasp which direction the partner character is with ease.

According to the present invention, it is possible to implement a network system, an information processing apparatus and an information processing program capable of grasping which direction the character corresponding to the chatting partner is.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
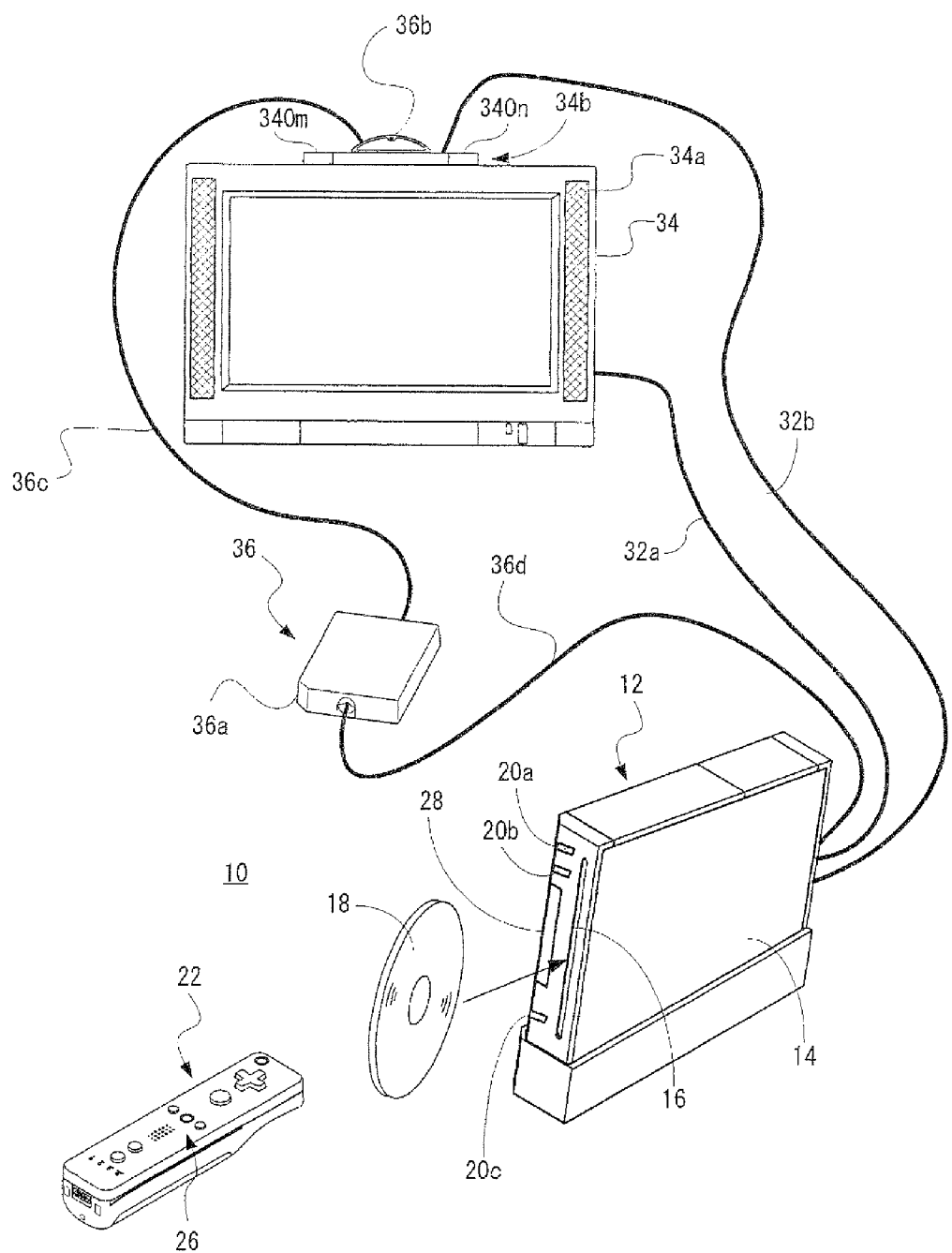
FIG. 1 is an illustrative view showing one embodiment of a game system of the present invention.

Referring to FIG. 1, a game system 10 of one embodiment of the present invention includes a video game apparatus (hereinafter referred to as "game apparatus") 12, a controller 22 and a sound input device 36. Although illustration is omitted, the game apparatus 12 in this embodiment is designed to be communicated with four controllers (22) at maximum. Furthermore, the game apparatus 12 and each controller (22) are connected by a wireless manner. For example, the wireless communication is executed according to a Bluetooth (registered trademark) standard, for example, but may be executed by other standards, such as infrared rays, a wireless LAN. On the other hand, for a connection between the game apparatus 12 and the sound input device 36, a wire system (USB format, for example) is used, for example. Specifically, the sound input device 36 is made up of a sound input device body 36a and a separate microphone 36b, and the sound input device body 36a and the microphone 36b are fixedly connected with a cable 36c. Then, the sound input device body 36a and the game apparatus 12 are detachably connected with a cable 36d.

The game apparatus 12 includes a roughly rectangular parallelepiped housing 14, and the housing 14 is furnished with a disk slot 16 on a front surface. An optical disk 18 as one example of an information storage medium storing game program, etc. is inserted through the disk slot 16 to be loaded into a disk drive 54 (see FIG. 2) within the housing 14. Around the disk slot 16, an LED and a light guide plate are arranged so as to light up in accordance with various processing.

Furthermore, at the upper part of the front surface of the housing 14 of the game apparatus 12, a power button 20a and a reset button 20b are provided, and an eject button 20c is provided below them. In addition, a connector cover for external memory card 28 is provided between the reset button 20b and the eject button 20c, and in the vicinity of the disk slot 16. Inside the connector cover for external memory card 28, a connector for external memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. It should be noted that storing the game data described above may be performed on an internal memory, such as a flash memory 44 (see FIG. 2) inside the game apparatus 12 in place of the memory card. Also, the memory card may be utilized as a backup memory for the internal memory.

Here, a general-purpose SD card can be employed as a memory card, but other general-purpose memory cards, such as memory sticks, a multimedia card (registered trademark) can be employed.

The game apparatus 12 has an AV cable connector 58 (FIG. 2) on the rear surface of the housing 14, and by utilizing the AV cable connector 58, a monitor 34 and a speaker 34a are connected to the game apparatus 12 through an AV cable 32a. The monitor 34 and the speaker 34a typically are a color television receiver, and through the AV cable 32a, a video signal from the game apparatus 12 is input to a video input terminal of the color television, and a sound signal from the game apparatus 12 is input to a sound input terminal. Accordingly, a game image of a three-dimensional (3D) video game, for example, is displayed on the screen of the color television (monitor) 34, and stereo game sound, such as a game music, a sound effect, etc. is output from the right and left speakers 34a. Around the monitor 34 (on the top side of the monitor 34, in this embodiment), a marker unit 34h including two infrared ray LEDs (markers) 340m and 340n is provided. The marker unit 34b is connected to the game apparatus 12 through a power source cable 32b. Accordingly, the marker unit 34b is supplied with power from the game apparatus 12. Thus, the markers 340m and 340n emit lights ahead of the monitor 34.

Furthermore, the power of the game apparatus 12 is applied by means of a general. AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 18 storing a program of a video game (or other applications the player wants to play), and loads the optical disk 18 into the disk drive 54 of the game apparatus 12. In response thereto, the game apparatus 12 starts to execute a video game or other applications on the basis of the program recorded in the optical disk 18. The user operates the controller 22 in order to apply an input to the game apparatus 12. For example, by operating any one of the input means 26, a game or other application is started. Besides the operation of the input means 26, by moving the controller 22 itself, it is possible to move a moving image object (player object) in different directions or change a perspective of the user (camera position) in a 3-dimensional game world.

Figure 2:
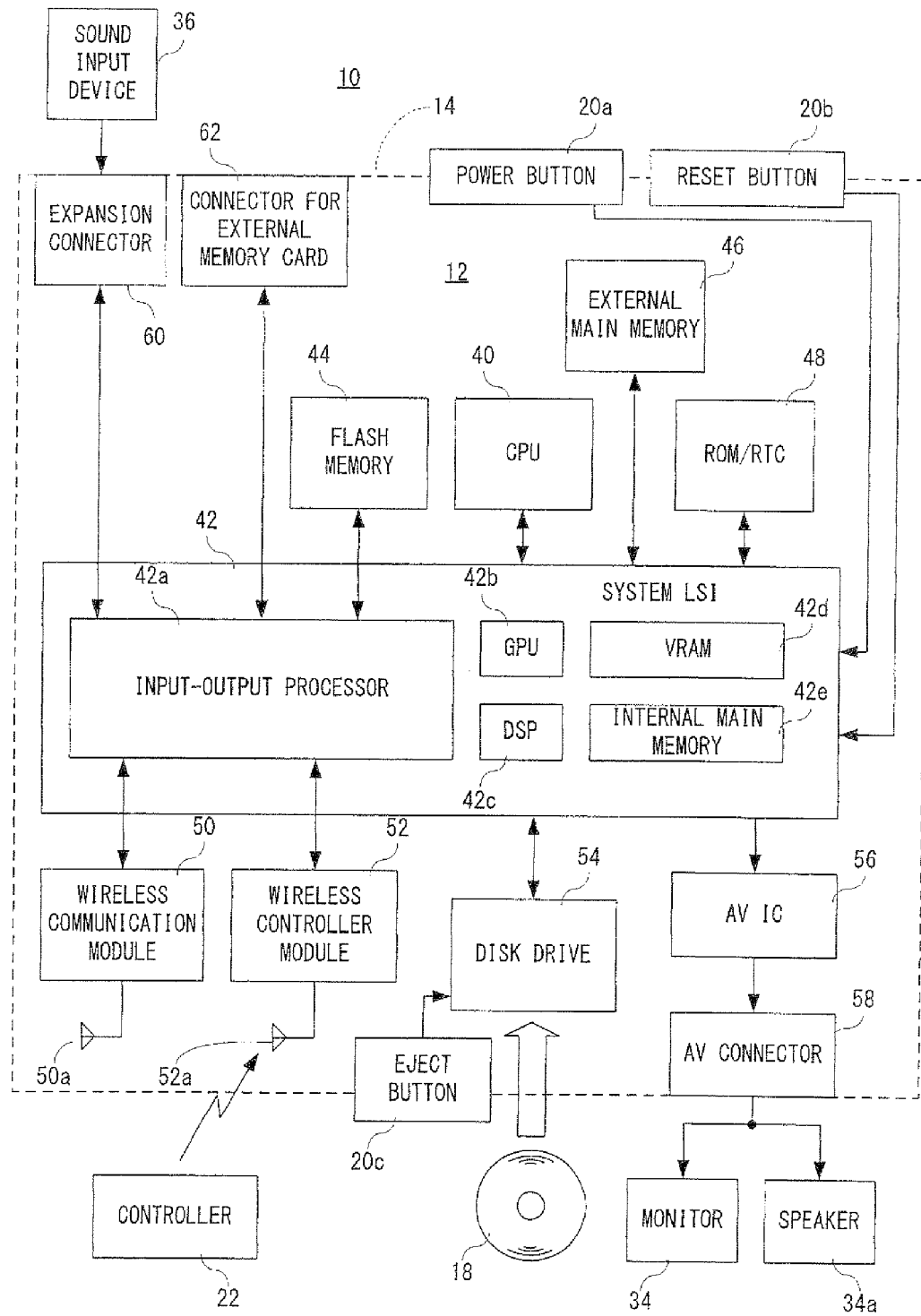
FIG. 2 is a block diagram showing an electric configuration of the game system.

FIG. 2 is a block diagram showing an electric configuration of the video game system 10 in FIG. 1 embodiment. Although illustration is omitted, the respective components within the housing 14 are mounted on a printed board. As shown in FIG. 2, the game apparatus 12 has a CPU 40, The CPU 40 functions as a game processor. The CPU 40 is connected with a system LSI 42. The system LSI 42 is connected with an external main memory 46, a ROM/RTC 48, a disk drive 54, and an AV IC 56.

The external main memory 46 is utilized as a work area or a buffer area of the CPU 40 by storing programs like a game program, etc., and various data. The ROM/RTC 48, the so-called boot ROM, is incorporated with a program for activating the game apparatus 12, and provided with a time circuit for counting a time. The disk drive 54 reads program data, texture data, etc. from the optical disk 18, and writes them in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e. These are connected with each other by internal buses although illustration is omitted.

The input-output processor (I/O processor) 42a executes transmission and reception of data, download of data, and so forth. A detailed description is made later in detail as to transmission and reception and download of the data.

The GPU 42b is made up of a part of a drawing means, and receives a graphics command (construction command) from the CPU 40 to generate game image data according to the command. Additionally, the CPU 40 applies an image generating program required for generating game image data to the GPU 42b in addition to the graphics command.

The GPU 42b is connected with the VRAM 42d as described above. The GPU 42b accesses the VRAM 42d to acquire the data (image data: data such as polygon data, texture data, etc.) required to execute the construction command. Additionally, the CPU 40 writes the image data required for drawing to the VRAM 42d via the GPU 42b. The GPU 42b accesses the VRAM 42d to create game image data for drawing.

In this embodiment, a description is made on a case that the GPU 42b generates game image data, but in a case of executing an arbitrary application except for the game application, the GPU 42b generates image data as to the arbitrary application.

Furthermore, the DSP 42c functions as an audio processor, and generates audio data corresponding to a sound, a voice, music, or the like by means of the sound data and the sound wave (tone) data which are stored in the internal main memory 42e and the external main memory 46.

The game image data and audio data which are generated as described above are read by the AV IC 56, and output to the monitor 34 and the speaker 34a via the AV connector 58. Accordingly, a game screen is displayed on the monitor 34, and a sound (music) necessary for the game is output from the speaker 34a.

Furthermore, the input-output processor 42a is connected with a flash memory 44, a wireless communication module 50, a wireless controller module 52, an expansion connector 60 and a connector for external memory card 62. The wireless communication module 50 is connected with an antenna 50a, and the wireless controller module 52 is connected with an antenna 52a.

Figure 6:
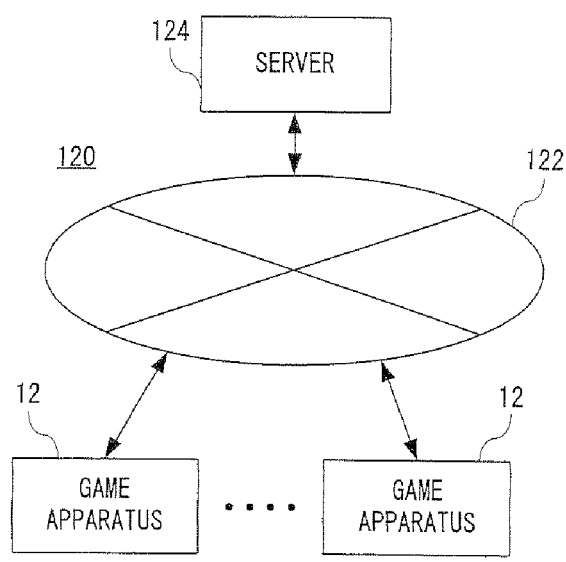
FIG. 6 is a block diagram showing a network system including a plurality of game apparatuses.

The input-output processor 42a can communicate with other game apparatuses and various servers to be connected to a network via the wireless communication module 50. One example of the network is shown in FIG. 6. The network 122 is made up of the Internet and a LAN, for example, and is connected with a server 124 and a plurality of game apparatuses 12, 12, . . . The server 124 downloads data to each game apparatus 12, and manages an online user who connects the game apparatus 12 to the network 122. It should be noted that the game apparatus 12 of the user is simply referred as a "game apparatus 12", and another game apparatus 12 is referred to as a "partner game apparatus (12)", for example.

It should be noted that the game apparatus 12 can directly communicate with another game apparatus (12) without going through the network. The input-output processor 42a periodically accesses the flash memory 44 to detect the presence or absence of data (referred to as data to be transmitted) being required to be transmitted to a network 122, and transmits it to the network via the wireless communication module 50 and the antenna 50a in a case that data to be transmitted is present. Furthermore, the input-output processor 42a receives data (referred to as received data) transmitted from another game apparatuses (12) via the network 122, the antenna 50a and the wireless communication module 50, and stores the received data in the flash memory 44. In a case that the received data does not satisfy a constant condition, the received data is abandoned as it is. In addition, the input-output processor 42a receives data (download data) downloaded from the server 124 via the network 122, the antenna 50a and the wireless communication module 50, and stores the download data in the flash memory 44.

Furthermore, the input-output processor 42a receives input data transmitted from the controller 22 via the antenna 52a and the wireless controller module 52, and (temporarily) stores it in the buffer area of the internal main memory 42e or the external main memory 46. The input data is erased from the buffer area after being utilized in the game processing by the CPU 40.

In this embodiment, as described above, the wireless controller module 52 performs a communication with the controller 22 in accordance with Bluetooth standards.

In addition, the input-output processor 42a is connected with the expansion connector 60 and the connector for external memory card 62. The expansion connector 60 is a connector for interfaces, such as USB, SCSI, etc., and can be connected with medium, such as the sound input device 36, an external storage, and peripheral devices like another controller. Furthermore, the expansion connector 60 is connected with a cable LAN adaptor, and can utilize the cable LAN in place of the wireless communication module 50. The connector for external memory card 62 can be connected with an external storage like a memory card. Thus, for example, the input-output processor 42a accesses the external storage via the expansion connector 60 and the connector for external memory card 62 to store and read the data.

Although a detailed description is omitted, as shown in FIG. 1, the game apparatus 12 (housing 14) is furnished with the power button 20a, the reset button 20b, and the eject button 20c. The power button 20a is connected to the system LSI 42. When the power button 20a is turned on, the system LSI 42 is set to a mode of a normal energized state in which the respective components of the game apparatus 12 are supplied with power through an AC adapter not shown (referred to as "normal mode"). On the other hand, when the power button 20a is turned off, the system LSI 42 is set to a mode in which only a part of the components of the game apparatus 12 is supplied with power, and the power consumption is reduced to minimum (hereinafter referred to as a "standby mode"). In this embodiment, in a case that the standby mode is set, the system LSI 42 issues an instruction to stop supplying the power to the components except for the input-output processor 42a, the flash memory 44, the external main memory 46, the ROM/RTC 48, the wireless communication module 50, and the wireless controller module 52. Accordingly, the standby mode is a mode in which the CPU 40 never performs the application.

Although the system LSI 42 is supplied with power even in the standby mode, generation of clocks to the GPU 42b, the DSP 42c and the VRAM 42d are stopped so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that the standby mode is not desired to be used, by making the standby mode unusable, when the power button 20a is turned off, the power supply to all the circuit components are completely stopped.

Furthermore, switching between the normal mode and the standby mode can be performed by turning on and off the power switch 26h of the controller 22 by remote control. If the remote control is not performed, setting is made such that the power supply to the wireless controller module 52a is not performed in the standby mode.

The reset button 20b is also connected to the system LSI 42. When the reset button 20b is pushed, the system LSI 42 restarts the activation program of the game apparatus 12. The eject button 20c is connected to the disk drive 54. When the eject button 20c is pushed, the optical disk 18 is removed from the disk drive 54.

FIG. 3(A) to FIG. 3(E) show one example of an external appearance of the controller 22. FIG. 3(A) shows a leading end surface of the controller 22, FIG. 3(B) shows a top surface of the controller 22, FIG. 3(C) shows a right surface of the controller 22, FIG. 3(D) shows a bottom surface of the controller 22, and FIG. 3(E) shows a trailing end of the controller 22.

Referring to FIG. 3(A) to FIG. 3(E), the controller 22 has a housing 22a formed by plastic molding, for example. The housing 22a is formed into an approximately rectangular parallelepiped shape and has a size small enough to be held by one hand of a user. The housing 22a (controller 22) is provided with the input means (a plurality of buttons or switches) 26. Specifically, as shown in FIG. 3(B), on a top surface of the housing 22a, there are provided a cross key 26a, a 1 button 26b, a 2 button 26c, an A button 26d, a −button 26e, a HOME button 26f, a +button 26g and a power switch 26h. Moreover, as shown in FIG. 3(C) and FIG. 3(D), an inclined surface is formed on the bottom surface of the housing 22a, and a B-trigger switch 26i is formed on the inclined surface.

The cross key 26a is a four directional push switch, including four directions of front (or upper), back (or lower), right and left operation parts. By operating any one of the operation parts, it is possible to instruct a moving direction of a character or an object (player character or player object) that is operable by a player, and instruct a moving direction of a cursor.

The 1 button 26b and the 2 button 26c are push button switches. They are used for a game operation, such as adjusting a viewpoint position and a viewpoint direction in displaying the 3D game image, i.e. a position and an image angle of a virtual camera. Alternatively, the 1 button 26b and the 2 button 26c can be used for the same operation as that of the A-button 26d and the B-trigger switch 26i or an auxiliary operation.

The A-button switch 26d is the push button switch, and is used for causing the player character or the player object to take an action other than a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth.

The −button 26e, the HOME button 26f, the +button 26g, and the power supply switch 26h are also push button switches. The −button 26e is used for selecting a game mode. The HOME button 26f is used for displaying a game menu (menu screen). The +button 26g is used for starting (resuming) or pausing the game. The power supply switch 26h is used for turning on/off a power supply of the game apparatus 12 by remote control.

In this embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26i is also the push button switch, and is mainly used for inputting a trigger such as shooting, and designating a position selected by the controller 22. In a case that the B-trigger switch 26i is continued to be pushed, it is possible to make movements and parameters of the player object constant. In a fixed case, the B-trigger switch 26i functions in the same way as a normal B-button, and is used for canceling the action and the command determined by the A-button 26d.

As shown in FIG. 3(E), an external expansion connector 22b is provided on the trailing end surface of the housing 22a, and as shown in FIG. 3(B), an indicator 22c is provided on the top surface and on the side of the trailing end surface of the housing 22a. The external expansion connector 22b is utilized for connecting another expansion controller not shown. The indicator 22c is made up of four LEDs, for example. The indicator 22c can show identification information (controller number) of the controller 22 corresponding to the lighted LED by lighting any one of the four LEDs, and show the remaining amount of the battery of the controller 22 depending on the number of LEDs to be emitted.

In addition, the controller 22 has an imaged information arithmetic section 80 (see FIG. 4), and as shown in FIG. 3(A), a light incident opening 22d of the imaged information arithmetic section 80 is provided on the leading end surface of the housing 22a. Furthermore, the controller 22 has a speaker 86 (see FIG. 4), and the speaker 86 is provided inside the housing 22a at the position corresponding to a sound release hole 22e between the 1 button 26b and the HOME button 26l on the top surface of the housing 22a as shown in FIG. 3(B).

Note that as shown in FIG. 3(A) to FIG. 3(E), the shape of the controller 22 and the shape, number and setting position of each input means 26 are simply examples, and needless to say, even if they are suitably modified, the present invention can be implemented.

Figure 4:
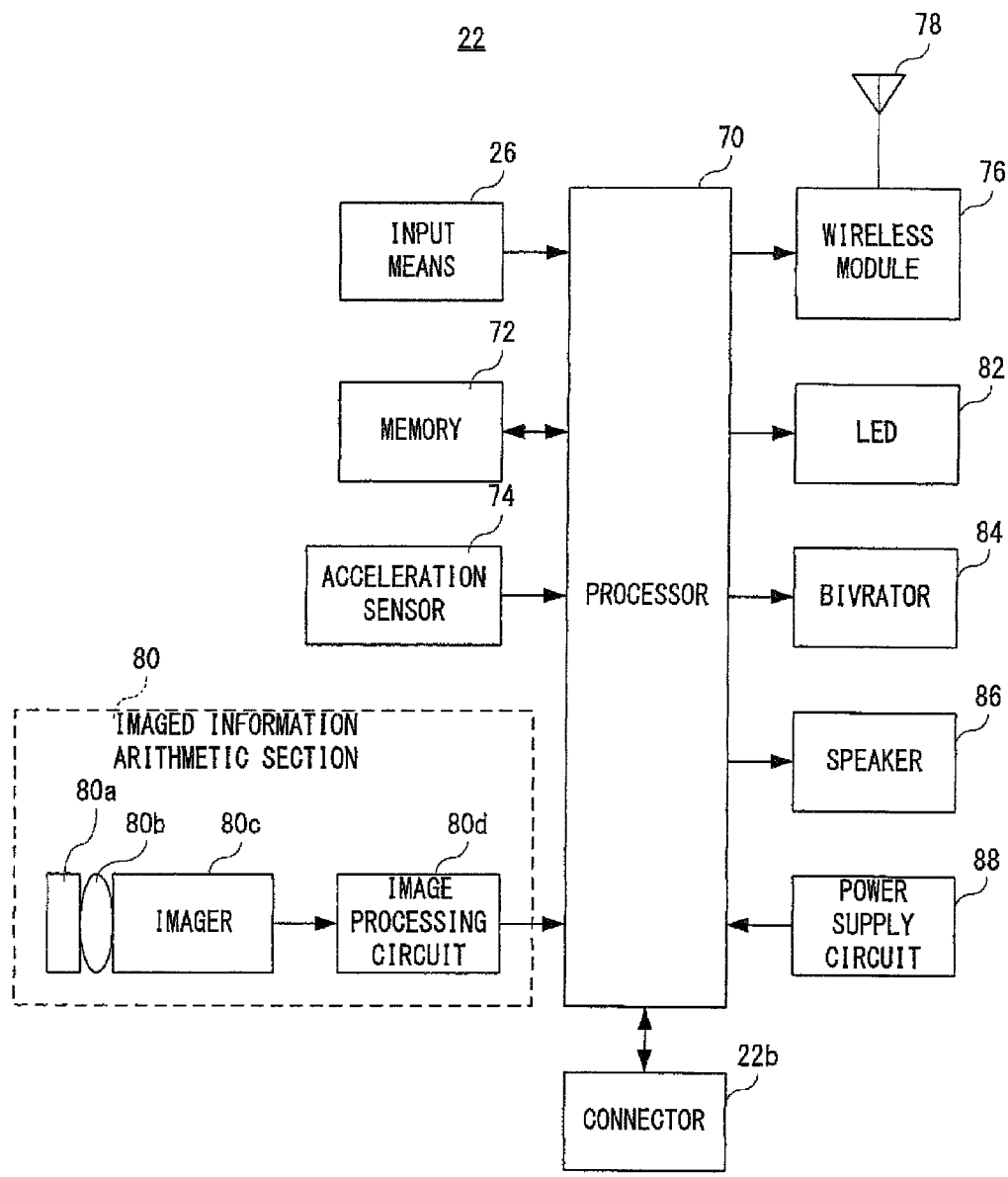
FIG. 4 is a block diagram showing an electric configuration of the controller.

FIG. 4 is a block diagram showing an electric configuration of the controller 22. Referring to FIG. 4, the controller 22 includes a processor 70, and the processor 70 is connected with the external expansion connector 22b, the input means 26, a memory 72, an acceleration sensor 74, a wireless module 76, the imaged information arithmetic section 80, an LED 82 (the indicator 22c), a vibrator 84, a speaker 86, and a power supply circuit 88 by an internal bus (not shown). Moreover, an antenna 78 is connected to the wireless module 76.

The processor 70 is in charge of an overall control of the controller 22, and transmits (inputs) information (input information) input by the input means 26, the acceleration sensor 74, and the imaged information arithmetic section 80 as input data to the game apparatus 12 via the wireless module 76 and the antenna 78. At this time, the processor 70 uses the memory 72 as a working area or a buffer area.

An operation signal (operation data) from the aforementioned input means 26 (26a to 26i) is input to the processor 70, and the processor 70 stores the operation data once in the memory 72.

Moreover, the acceleration sensor 74 detects each acceleration of the controller 22 in directions of three axes of vertical direction (y-axial direction), lateral direction (x-axial direction), and forward and rearward directions (z-axial direction). The acceleration sensor 74 is typically an acceleration sensor of an electrostatic capacity type, but the acceleration sensor of other types may also be used.

For example, the acceleration sensor 74 detects the accelerations (ax, ay, and az) in each direction of x-axis, y-axis, z-axis for each first predetermined time, and inputs the data of the acceleration (acceleration data) thus detected to the processor 70. For example, the acceleration sensor 74 detects the acceleration in each direction of the axes in a range from −2.0 g to 2.0 g (g indicates a gravitational acceleration. The same thing can be said hereafter.) The processor 70 detects the acceleration data given from the acceleration sensor 74 for each second predetermined time, and stores it in the memory 72 once. The processor 70 creates input data including at least one of the operation data, acceleration data, and marker coordinate data as described later, and transmits the input data thus created to the game apparatus 12 for each third predetermined time (5 msec, for example).

Figure 3:
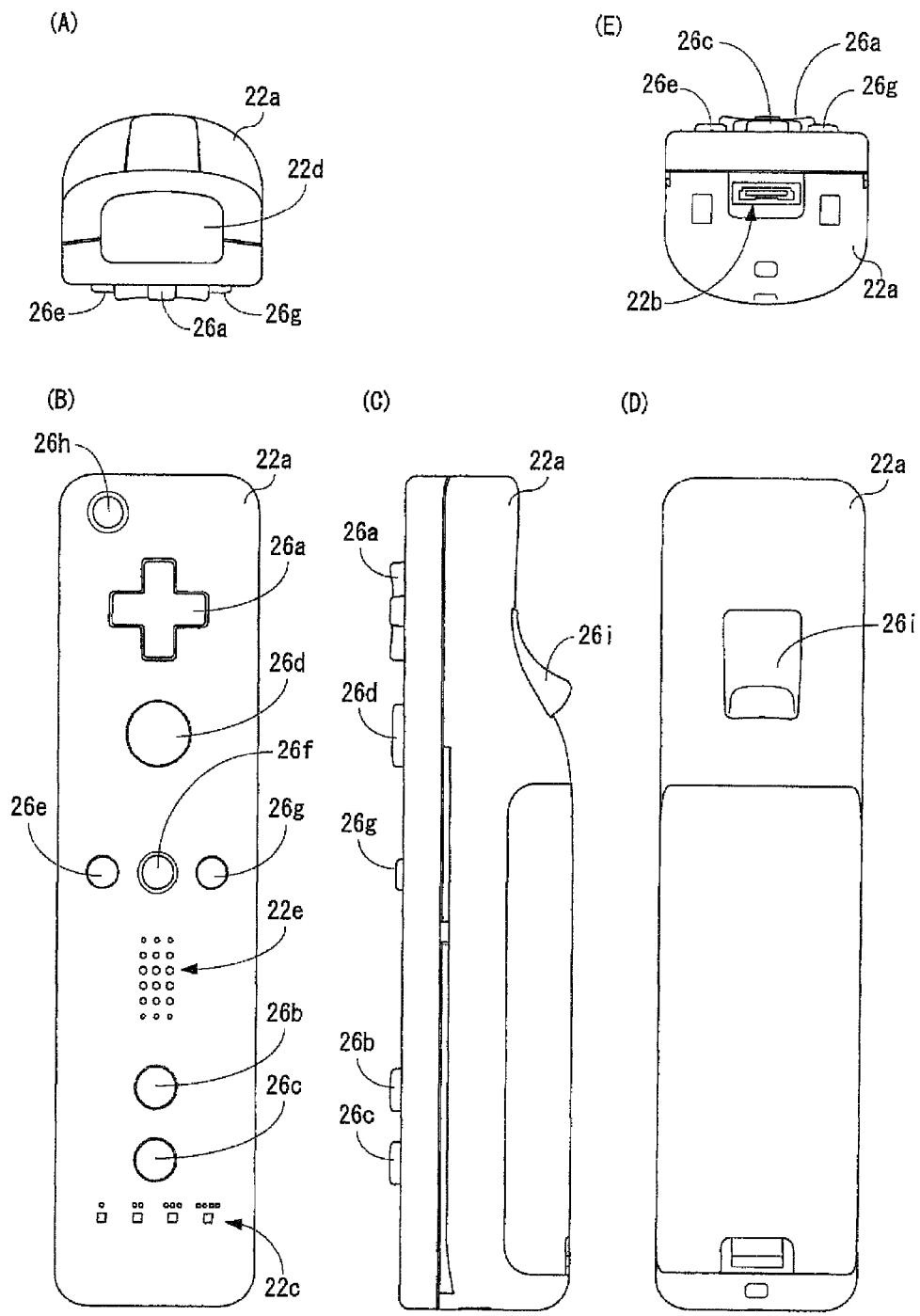
FIG. 3 is an illustrative view showing an appearance of a controller.

In this embodiment, although omitted in FIG. 3 (A) to FIG. 3 (E), the acceleration sensor 74 is provided inside the housing 22a on the circuit board in the vicinity of a place where the cross key 26a is arranged.

The wireless module 76 modulates a carrier of a predetermined frequency by the input data, by using a technique of Bluetooth, for example, and emits its weak radio wave signal from the antenna 78. Namely, the input data is modulated to the weak radio wave signal by the wireless module 76 and transmitted from the antenna 78 (controller 22). The weak radio wave signal thus transmitted is received by the wireless controller module 52 provided to the aforementioned game apparatus 12. The weak radio wave thus received is subjected to demodulating and decoding processing. This makes it possible for the game apparatus 12 (CPU 40) to acquire the input data from the controller 22. Then, the CPU 40 performs game processing, following the acquired input data and the program (game program).

In addition, as described above, the controller 22 is provided with the imaged information arithmetic section 80. The imaged information arithmetic section 80 is made up of an infrared rays filter 80a, a lens 80b, an imager 80c, and an image processing circuit 80d. The infrared rays filter 80a passes only infrared rays from the light incident from the front of the controller 22. As described above, the markers 340m and 340n placed near (around) the display screen of the monitor 34 are infrared LEDs for outputting infrared lights ahead of the monitor 34. Accordingly, by providing the infrared rays filter 80a, it is possible to image the image of the markers 340m and 340n more accurately. The lens 80b condenses the infrared rays passing thorough the infrared rays filter 80a to emit them to the imager 80c. The imager 80c is a solid imager, such as a CMOS sensor and a CCD, for example, and images the infrared rays condensed by the lens 80b. Accordingly, the imager 80c images only the infrared rays passing through the infrared rays filter 80a to generate image data. Hereafter, the image imaged by the imager 80c is called an "imaged image". The image data generated by the imager 80c is processed by the image processing circuit 80d. The image processing circuit 80d calculates a position of an object to be imaged (markers 340m and 340n) within the imaged image, and outputs each coordinate value indicative of the position to the processor 70 as imaged data for each fourth predetermined time.

Figure 5:
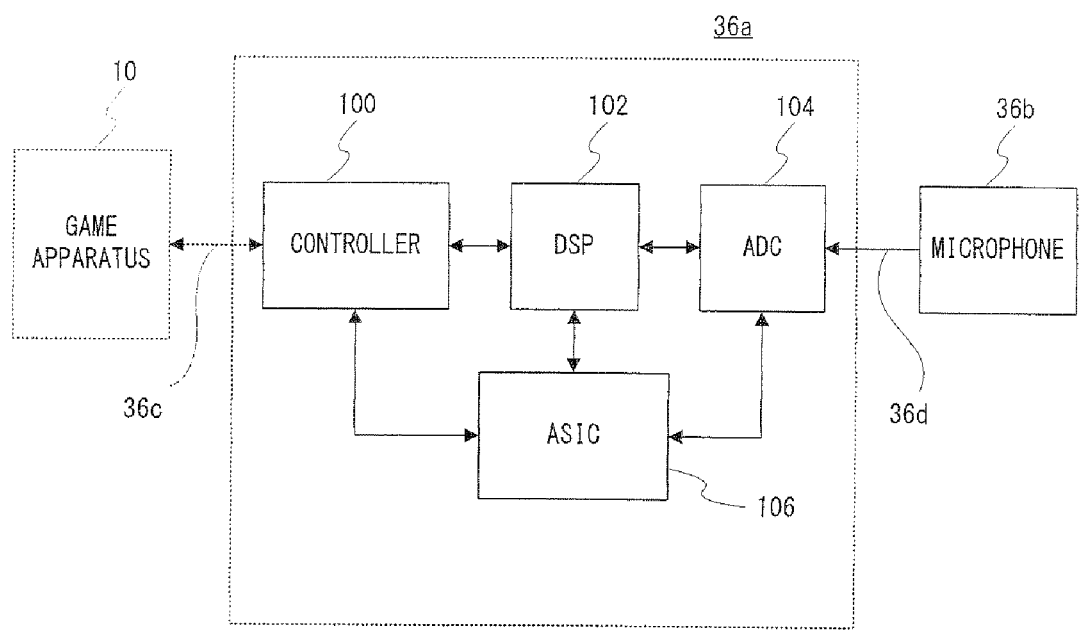
FIG. 5 is a block diagram showing an electric configuration of a sound input device.

FIG. 5 is a block diagram showing an electric configuration of the sound input device body 36a. Referring to FIG. 5, the sound input device body 36a includes a controller 100, a DSP 102, an ADC 104, and an ASIC 106. The controller 100 is made up of 8 bit micro-controller, for example, and controls a communication with the game apparatus 12. The controller 100 is connected with the DSP 102, the ADC 104 and the microphone 36b via the cable 36c. The microphone 36b is made up of four electret condenser microphones (ECM), for example, and converts a voice including a user's speech into a sound signal of 4 ch. The ADC 104 is made up of four A/D converters (sampling frequency: 16 kHz) for example, and converts the sound signal of 4 ch from the microphone 36b into audio data. The DSP 102 is made up of 16 bit fixed point DSP, for example, and performs processing, such as echo cancellation, echo suppression, noise suppression, etc. on the audio data of 4 ch from the ADC 104. By these processing, it is possible to prevent echo, acoustic feedback from occurring due to capturing the output from the speaker 34a via the microphone 36b. The audio data after the processing by the DSP 102 is transmitted to the game apparatus 12 by the controller 100.

The ASIC 106 is made up of a gate array IC, for example, and synchronizes the game apparatus 12 and the sound input device 36 by controlling an operation timing of each of the controller 100, the DSP 102 and the ADC 104. Moreover, a reset sequence control at a time of turning power on and off is performed by the ASIC 106. Here, power for operating the controller 100, the ASIC 106, etc. is supplied from the game apparatus 12 to the sound input device 36 through the cable 36d (USB cable, for example).

The audio data transmitted from the sound input device 36 (controller 100) in a manner described above is received by the input-output processor 42a through the expansion connector 60. The received audio data is temporarily stored in the internal main memory 42e, and then applied to the wireless communication module 50 by the input-output processor 42a. The wireless communication module 50 transmits the applied audio data to the game apparatus (12) of the partner from the antenna 50a via the network 122.

In the game apparatus (12) of the partner, the audio data from the game apparatus 12 is received through the antenna (50a) and the wireless communication module 50 by the input-output processor (42a). The received audio data is temporarily stored in the internal main memory (42e), and then is applied to the AV IC (56). The AV IC (56) performs D/A conversion on the applied audio data, and outputs the sound signal thus acquired to the speaker (34a) via the AV connector (58). Thus, the speech voice by the user is output from the speaker (34a) of the partner.

Figure 7:
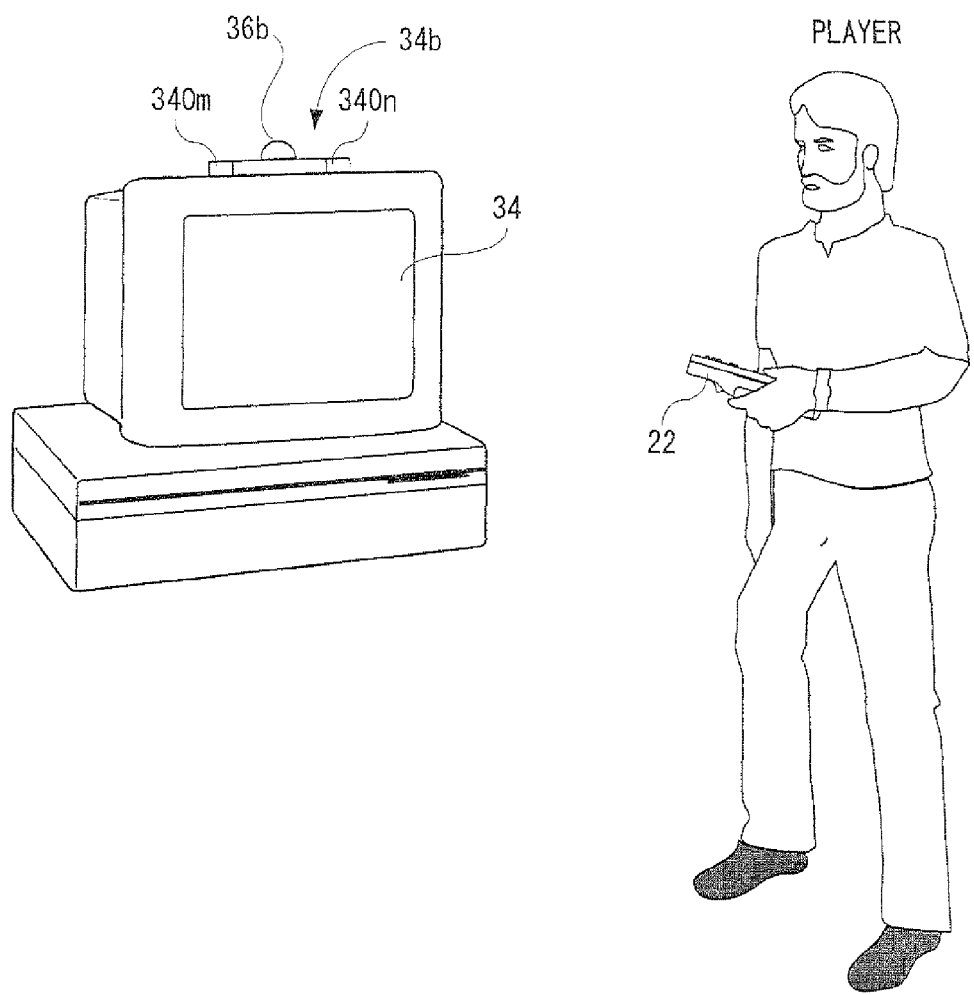
FIG. 7 is an illustrative view roughly explaining a state when a virtual game is played by means of the controller and the sound input device.

FIG. 7 is an illustrative view roughly illustrating a situation in which the user plays a virtual game, such as "underwater swimming game" (described later) by means of the controller 22 and the sound input device 36. As shown in FIG. 7, when playing the virtual game by means of the controller 22 and the sound input device 36 in the video game system 10, the player is placed several meters, 1-3 meters, for example, away from the monitor 34 (microphone 36b), and holds the controller 22 with one hand. Strictly speaking, the player holds the controller 22 with the leading end of the controller 22 (the side of the light incident opening 22d of the light imaged by the imaged information arithmetic section 80) turned to the markers 340m and 340n. Here, as understood from FIG. 1, the markers 340m and 340n are arranged in parallel with the horizontal direction of the screen of the monitor 34. In this state, the player performs a game operation by changing a position on the screen designated by the controller 22, changing the distance between the controller 22 and each of the markers 340m and 340n, and making a speech to the microphone 36b.

Figure 8:
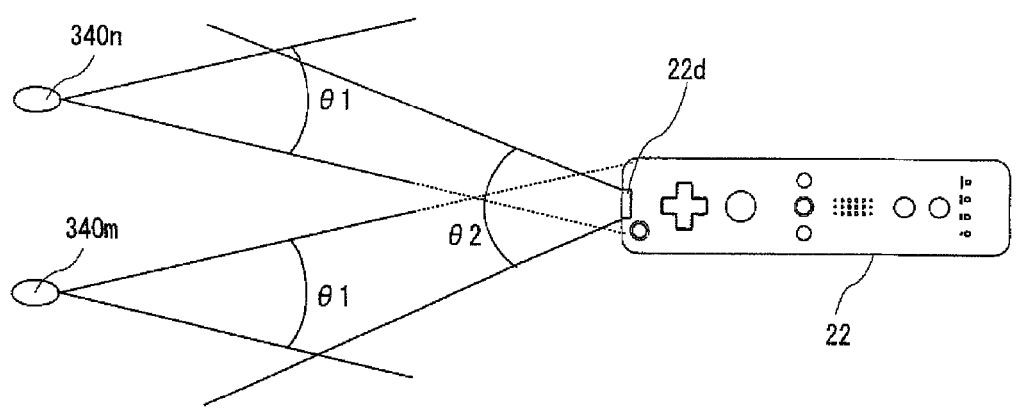
FIG. 8 is an illustrative view showing viewing angles of markers and the controller.

FIG. 8 is an illustrative view showing viewing angles between the respective markers 340m and 340n, and the controller 22. As shown in FIG. 8, each of the markers 340m and 340n emits infrared ray within a range of a viewing angle θ1. Also, the imager 80c of the imaged information arithmetic section 80 can receive incident light within the range of the viewing angle 82 taking the line of sight of the controller 22 as a center. For example, the viewing angle 81 of each of the markers 340m and 340n is 34° (half-value angle) while the viewing angle θ2 of the imager 80c is 41°. The player holds the controller 22 such that the imager 80c is directed and positioned so as to receive the infrared rays from the markers 340m and 340n. More specifically, the player holds the controller 22 such that at least one of the markers 340m and 340n exists in the viewing angle θ2 of the imager 80c, and the controller 22 exists in at least one of the viewing angles θ1 of the marker 340m or 340n. In this state, the controller 22 can detect at least one of the markers 340m and 340n. The player can perform a game operation by changing the position and the attitude of the controller 22 in the range satisfying the state.

If the position and the attitude of the controller 22 are out of the range, the game operation based on the position and the attitude of the controller 22 cannot be performed. Hereafter, the above-described range is called an "operable range".

Figure 9:
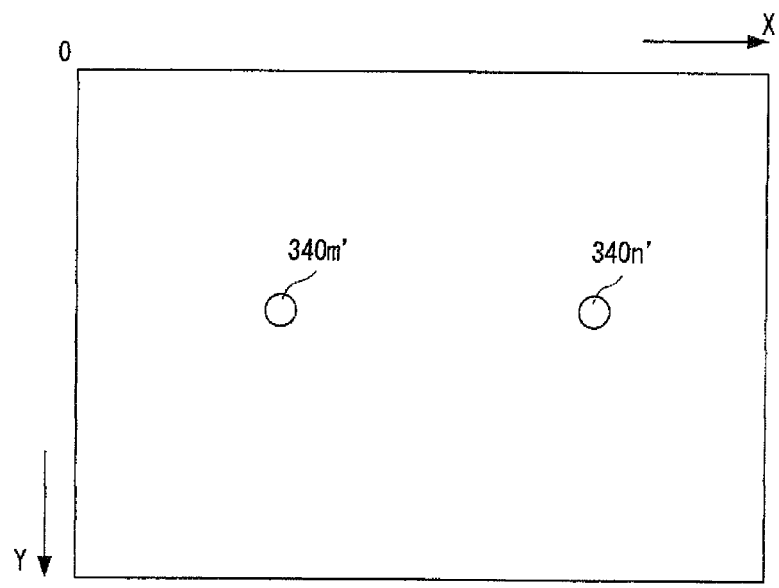
FIG. 9 is an illustrative view showing one example of an imaged image by the controller.

If the controller 22 is held within the operable range, an image of each of the markers 340m and 340n is imaged by the imaged information arithmetic section 80. That is, the imaged image obtained by the imager 80c includes an image (object image) of each of the markers 340m and 340n as an object to be imaged. FIG. 9 is an illustrative view showing one example of the imaged image including the object images. The image processing circuit 80d calculates coordinates (marker coordinates) indicative of the position of each of the markers 340m and 340n in the imaged image by utilizing the image data of the imaged image including the object images.

Since the object image appears as a high-intensity part in the image data of the imaged image, the image processing circuit 80d first detects the high-intensity part as a candidate of the object image. Next, the image processing circuit 80d determines whether or not the high-intensity part is the object image on the basis of the size of the detected high-intensity part. The imaged image may include images other than the object image due to sunlight through a window and light of a fluorescent lamp in the room as well as the images 340m' and 340n' corresponding to the two markers 340m and 340n as an object image. The determination processing whether or not the high-intensity part is an object image is executed for discriminating the images 340m' and 340n' of the markers 340m and 340n as an object image from the images other than them, and accurately detecting the object image. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 80d calculates the position of the high-intensity part. More specifically, the barycenter position of the high-intensity part is calculated. Here, the coordinates of the barycenter position is called a "marker coordinate". Also, the barycenter position can be calculated with more detailed scale than the resolution of the imager 80c. Now, the resolution of the imaged image imaged by the imager 80c shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, the two high-intensity parts are determined as object images by the determination process, and therefore, two marker coordinates are calculated. The image processing circuit 80d outputs data indicative of the calculated two marker coordinates. The output data of the marker coordinates (marker coordinate data) is included in the input data by the processor 70 as described above, and transmitted to the game apparatus 12.

The game apparatus 12 (CPU 40) detects the marker coordinate data from the received input data to thereby calculate a designated position (designated coordinate) by the controller 22 on the screen of the monitor 34 and a distances from the controller 22 to each of the markers 340m and 340n on the basis of the marker coordinate data. More specifically, from the position of the mid point of the two marker coordinates, a position to which the controller 22 faces, that is, a designated position is calculated. The distance between the object images in the imaged image is changed depending on the distance between the controller 22 and each of the markers 340m and 340n, and therefore, the game apparatus 12 can grasp the distance between the controller 22 and each of the markers 340m and 340n by calculating the distance between the two marker coordinates.

In a case of playing the "underwater swimming game" in the game system 10 configured as described above, the user connects the game apparatus 12 to the network 122 (see FIG. 6). The server 124 registers a user who currently connects the game apparatus 12 to the network 122 as an online user, and the user selects a partner from these online users. In response thereto, the game apparatus 12 of the user and the game apparatus (12) of the partner are connected with each other to thereby perform a data communication for the game processing. Thus, the network system 120 including the server 124 and the plurality of game apparatuses 12 (game system 10) as shown in FIG. 6 is established.

The game apparatus 12 (CPU 40) executes following game processing on the basis of operation data and/or marker coordinate data included in the input data from the controller 22, input data from the sound input device 36, that is, audio data, and position data and audio data included in the reception data from the game apparatus 12 of the partner. Here, acceleration data included in the input data from the controller 22 is not specifically utilized in the "underwater swimming game".

Figure 10:
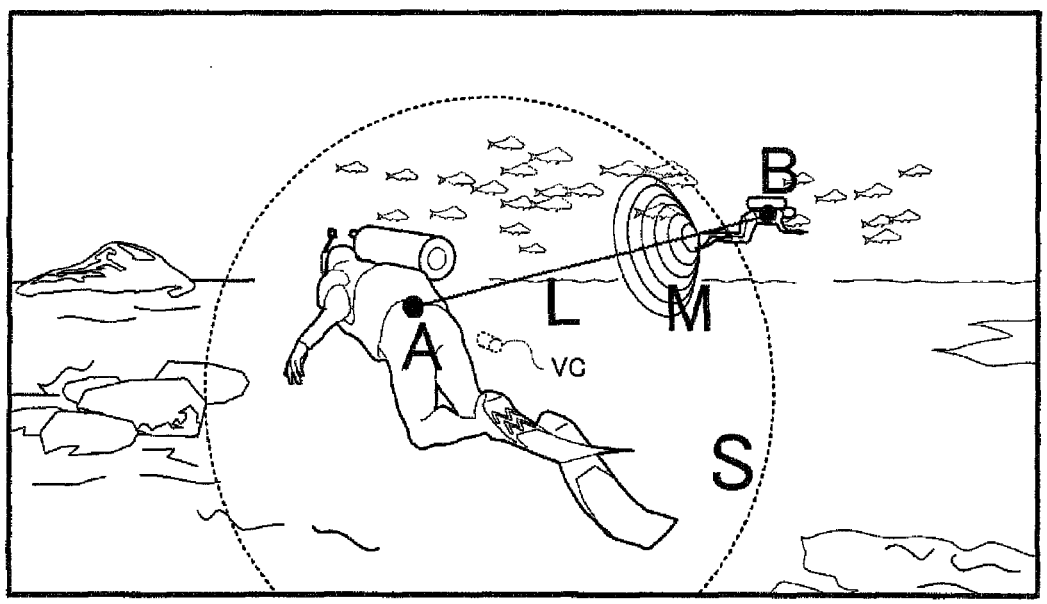
FIG. 10 is an illustrative view showing a part of a three-dimensional virtual space.

In the game processing, a position of the own character A is calculated from the operation data and/or the marker coordinate data, the own character A is moved within the three-dimensional virtual space (hereinafter referred to as "virtual space") on the basis of the calculation result, and the partner character B is also moved within the virtual space on the basis of the received position data. Furthermore, the input audio data is transmitted to the game apparatus (12) of the partner, and the voice of the partner is output on the basis of the received audio data. Thus, as shown in FIG. 10, the user (own character A) can enjoy swimming underwater within the virtual space while chatting with the partner (partner character B).

At this time, on the side of the user, an image capturing a virtual space as shown in FIG. 11-FIG. 15 from the rear of the own character A with the virtual camera VC is displayed on the monitor 34 as a game screen. From the speaker 34a, a voice of the partner is output. On the other hand, on the side of the partner, an image capturing the virtual space from the rear of the partner character B with another virtual camera VC is displayed on the monitor (34), and a voice of the user is output from the speaker (34*a*).

However, the user freely moves the own character A, and the partner also freely moves the partner character B, so that the partner character B is not necessarily always within the visual field range of the own character A. If the partner character B is out of the visual field range of the own character A, the own character A, that is, the user cannot know where the partner character B, that is, the partner is, and can hear the voice of the partner.

Figure 22:
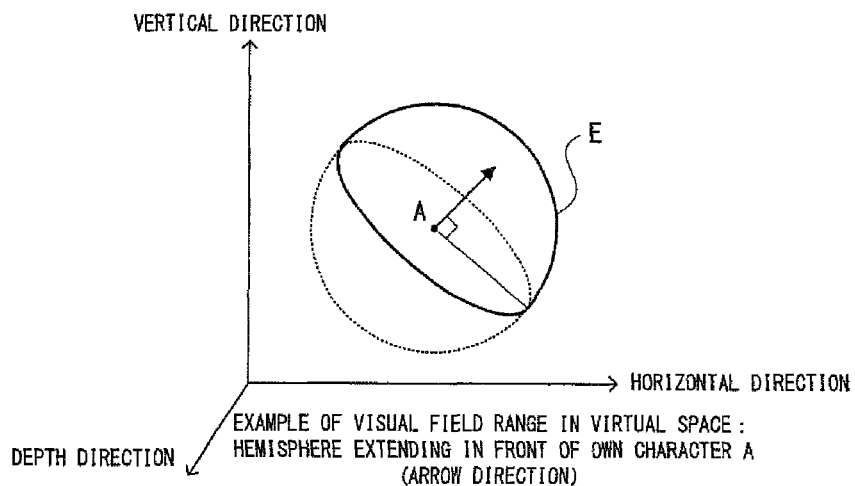
FIG. 22 is an illustrative view showing one example of a visual field range.

The visual field range, here, is defined as shown in FIG. 22, for example, within the virtual space. The visual field range E shown in. FIG. 22 is a part in front (that is, the front half of the sphere: This is called "hemisphere") of the own character A out of the range in which the distance from the own character A (point A indicating it) is equal to or less than a predetermined value r0 (that is, the inside of the sphere centered at a point A with radius r0). Here, the sphere with radius r0 may not be perfect sphere, or may take a shape of a rugby ball extending in a depth direction, for example, or may be deformed in cross section toward the depth. Or, this may be a polyhedron (rectangular parallelepiped, quadrangular pyramid, etc.) arranged in font of the own character A, and may be an object in front of the own character A within the virtual space, and a three-dimensional area having an arbitrary shape over the surface of the earth. In another embodiment, the visual field range may be an imaging range (that is, the game screen itself as shown in FIG. 12-FIG. 15) by the virtual camera VC following the own character A (described later).

Thereupon, the game apparatus 12 determines whether or not the partner character B is inside the visual field range (within the visual field) of the own character A. Then, when it is determined that the partner character B is inside the visual field, the game apparatus 12 calculates a direction of the partner character B seen from the own character A and the distance between both of the characters on the basis of the positions of the own character A and the partner character B, and displays an index object M visually representing the calculation result on the screen (see FIG. 10). The direction, here, is calculated as a direction of a straight line L passing through the two points A and B respectively representing the positions of the own character A and the partner character B (in other words, a direction of the vector AB from the point A to the point B), and the distance is calculated as a distance vector AB between the two points A and B (magnitude of the vector AB).

Figure 14:
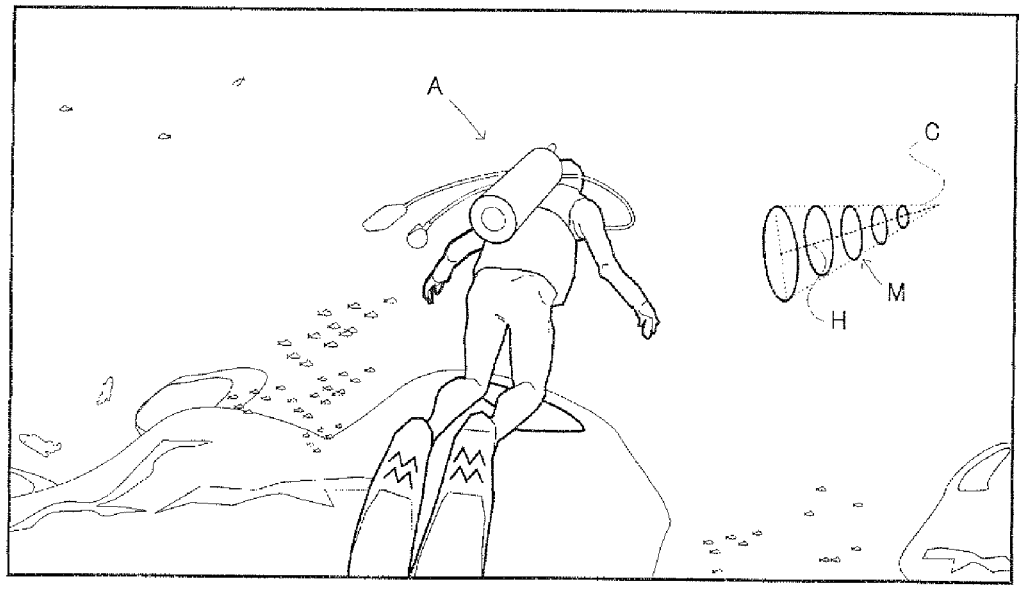
FIG. 14 is an illustrative view showing still another example of the game screen.
Figure 15:
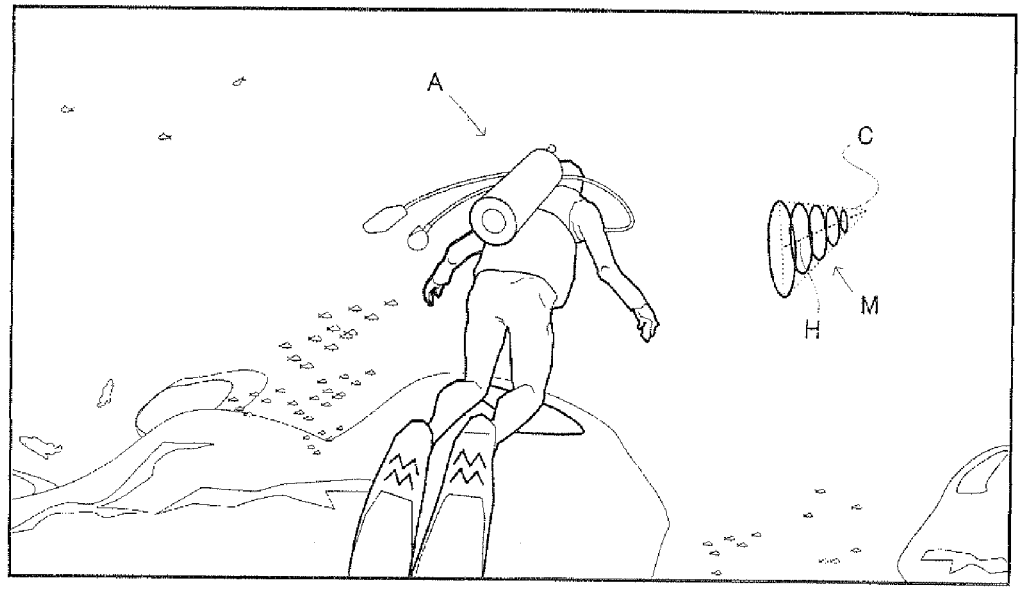
FIG. 15 is an illustrative view showing a further example of the game screen.

The index object M is made up of a plurality of rings about the periphery of the cone C represented by dotted lines, for example, as shown in FIG. 14 and FIG. 15, and the cone C is directed to the calculated direction (direction of the straight line L), and has a height (height H in proportion to the distance) corresponding to the calculated distance (distance between the 2 points A and B). Accordingly, the direction and the height of the cone C are changed depending on the positional relationship between the own character A and the partner character B, and the direction and the height of the plurality of rings about the cone C are also changed.

The display position of the index object M is decided as shown in a following manner, for example. Referring to FIG. 10, a sphere S centered at the character A with predetermined radius is first generated within the virtual space, and an intersection point of the surface of the sphere S and the straight line L is next evaluated. Then, the index object M is displayed in such a position that its tip (vertex of the cone C) is inscribed with the surface of the sphere S at the position of the intersection point. Accordingly, the index object M is always inside the sphere S.

Here, the sphere S may extend off the game screen by the camera angle, etc., and thus, the index object M may also extend off the game screen. However, in such a case, a position adjustment is performed so as not to make the index object M extend off the game screen by approaching the index object M to the own character A along the straight line L, for example.

Figure 11:
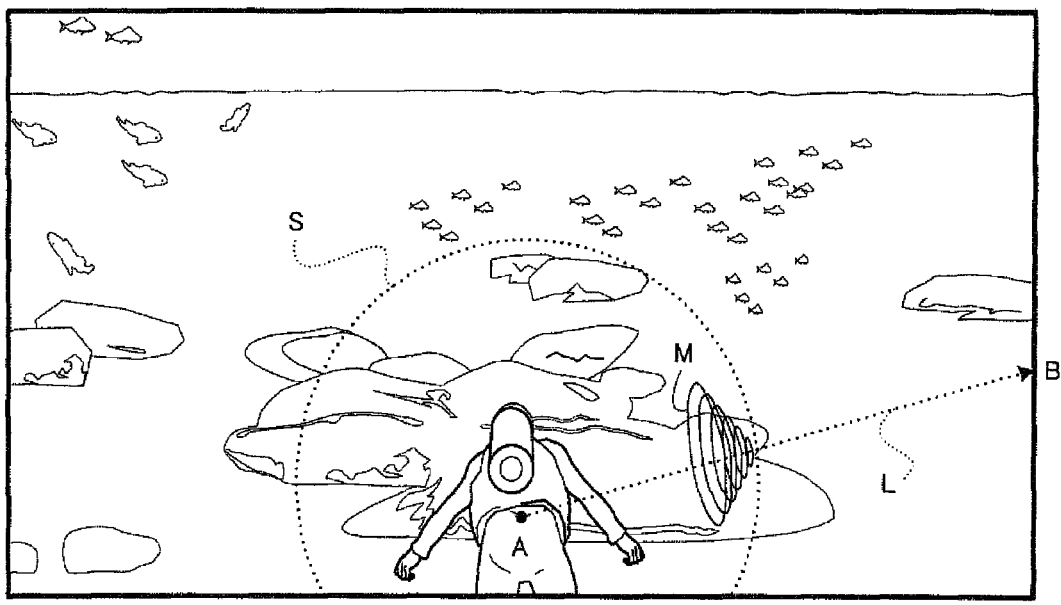
FIG. 11 is an illustrative view showing one example of an image when the three-dimensional virtual space is seen from a virtual camera.

Thus, the index object M is displayed in order to indicate where the partner character B is (direction seen from the own character A and distance) in a state that the partner character B extends off the game screen, and therefore, this is erased from the game screen in a state that the partner character B is within the game screen. Here, the straight line L and the sphere S shown in FIG. 10 and FIG. 11 are not drawn in the game screen for display in this embodiment (see FIG. 12-FIG. 15). In another embodiment, the straight line L and/or the sphere S may be drawn.

Figure 12:
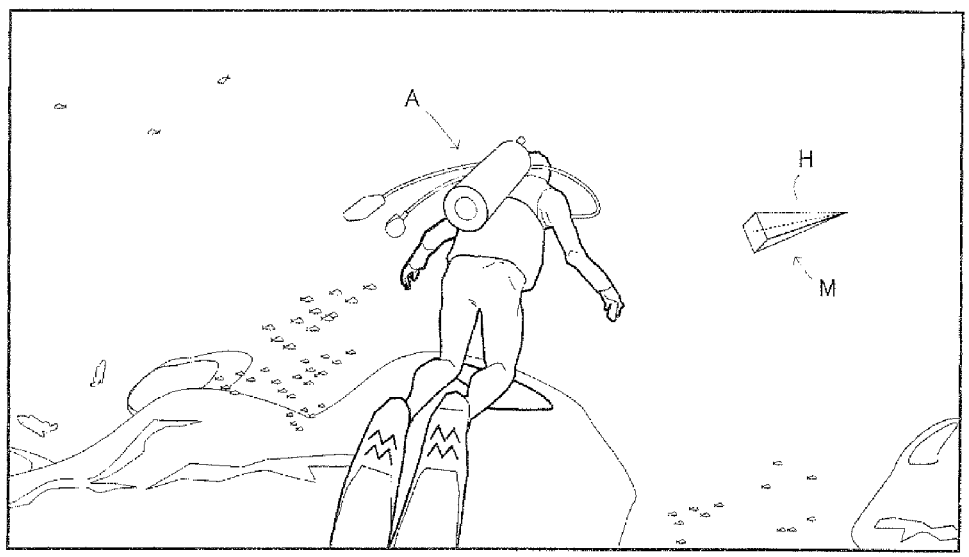
FIG. 12 is an illustrative view showing one example of the game screen.
Figure 13:
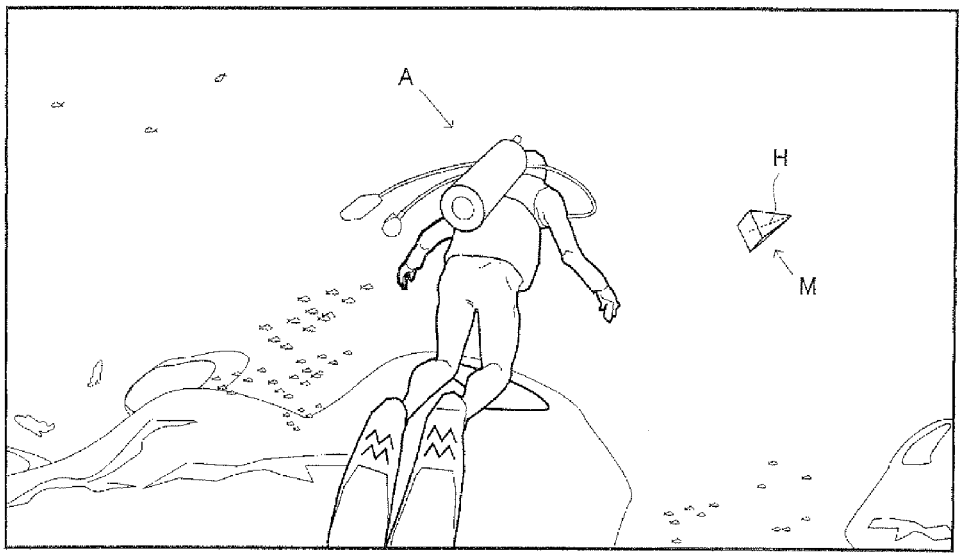
FIG. 13 is an illustrative view showing another example of the game screen.

Furthermore, the index object. M is deformed depending on a speaking situation of the partner (whether or not the partner is making a speech). The above-described ring-shape index object M (see FIG. 14 and FIG. 15) is displayed while the partner is making a speech, and a quadrangular pyramid index object M as shown in FIG. 12 and FIG. 13, for example, is displayed when the partner does not make a speech. The quadrangular pyramid index object M corresponds to the cone C defining the above-described ring-shape index object M, representing the direction of the partner character B by its vertex and the distance to the partner character B by its height (H). It should be noted that the shape of the index object M may take any shape if it can represent the direction and distance (shape of an arrow and a finger, for example).

Accordingly, in FIG. 12-FIG. 15, the fact that the index object M indicates a diagonally forward right can show that the partner character B is positioned diagonally forward right of the own character A. Furthermore, in FIG. 12 and FIG. 14, the fact that the height H of the index object M is relatively high can show the partner character B is far away from the own character A while in. FIG. 13 and FIG. 15, the fact that the height H of the index object M is relatively low can show that the partner character B is at a place (directly outside the visual field range E) not so far away from the own character A. Furthermore, in FIG. 14 and FIG. 15, the fact that index object M takes a shape made of rings can show that the partner is making a speech while in FIG. 12 and FIG. 13, the fact that the index object M takes a shape of a quadrangular pyramid can show that the partner is not making a speech.

It should be noted that although not illustrated in FIG. 12-FIG. 15, a display color of the partner is also changed depending on whether or not the partner is making a speech. In another embodiment, only the display color may be changed without the shape of the index object M being changed. Generally, the display manner of the index object M may be changed depending on whether or not the partner is making a speech. The display manner here includes a shape, a color, a size, brightness, shades of color, blinking cycles, unsteadiness, etc., and at least one of term is an object to be changed.

Figure 16:
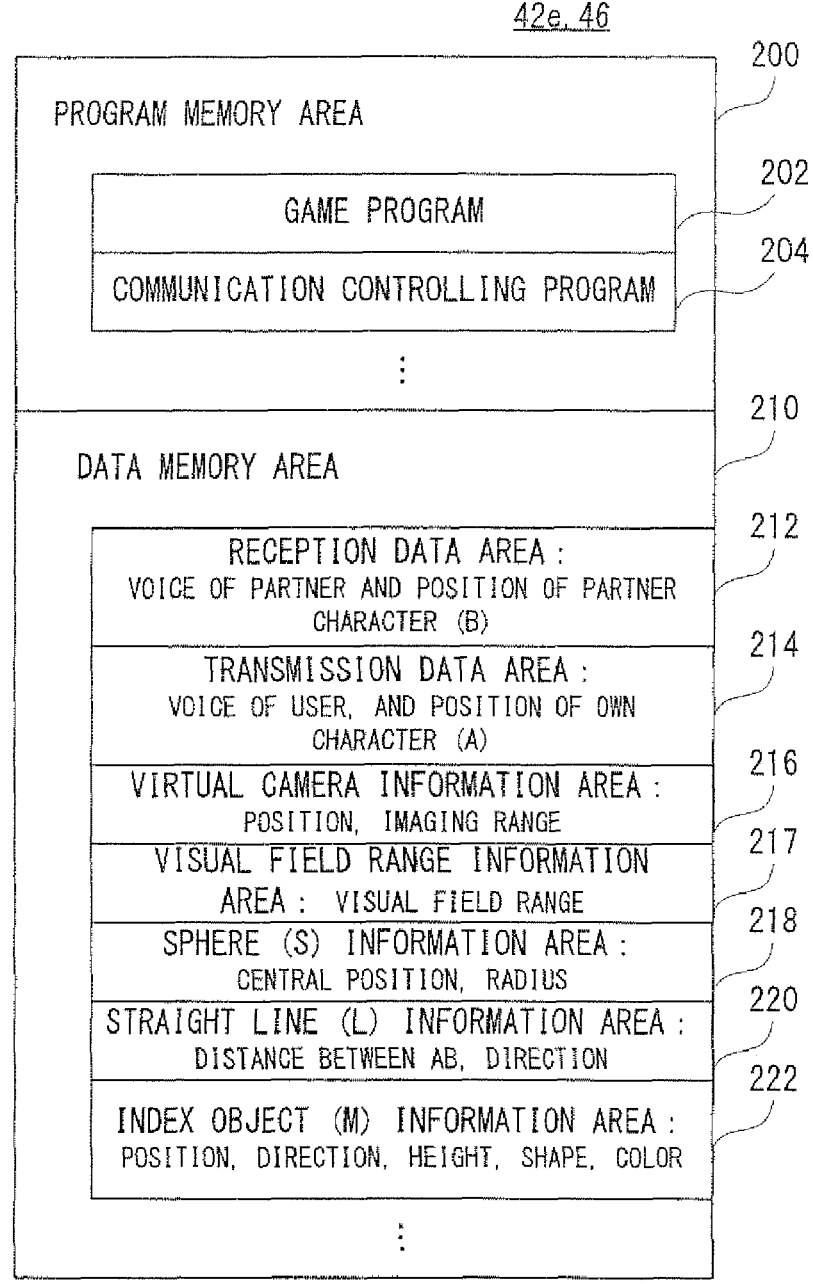
FIG. 16 is an illustrative view showing one example of a memory map.

The concrete game processing for implementing the "underwater swimming game" is explained according to a memory map in FIG. 16 and flowcharts in FIG. 17-FIG. 21. When the "underwater swimming game" is played, a program memory area 200 and a data memory area 210 are formed in the internal main memory 42*e* and/or the external main memory 46 as shown in FIG. 16, and the program memory area 200 stores a game program 202, a communication controlling program 204, etc.

The game program 202 is software of implementing the "underwater swimming game" by controlling the entire hardware (see FIG. 2) via the CPU 40, and corresponds to the flowcharts in FIG. 17-FIG. 21. The communication controlling program 204 is software for performing a data communication between other game apparatuses (12) and the server 124 via the network 122 by mainly controlling the input-output processor 42a and the wireless communication module 50, and utilized by the game program 202.

The data memory area 210 includes a reception data area 212, a transmission data area 214, a virtual camera information area 216, a visual field range information area 217, a sphere information area 218, a straight line information area 220, an index object information area 222, etc. The reception data area 212 stores reception data from the game apparatus 12 of the partner. The reception data includes audio data indicating a voice of the partner and position data indicating a position of the partner character B. The transmission data area 214 stores transmission data to the game apparatus 12 of the partner. The transmission data includes audio data indicating a voice of the user and position data indicating a position of the own character A. The virtual camera information area 216 stores virtual camera information indicating a position and an imaging range with respect to the virtual camera VC following the own character A. The visual field range information area 217 stores visual field information indicating the visual field range E of the own character A. The sphere information area 218 stores sphere information indicating a central position and a radius of the sphere S. The straight line information area 220 stores straight line information indicating a distance between the two points A and B and a direction with respect to the straight line L. The index object information area 222 stores index object information indicating the position, direction, height, shape and color with respect to the index object M. It should be noted that the content stored in each area 212-222 is updated for each frame, for example, according to the game program 202 and the communication controlling program 204.

Figure 17:
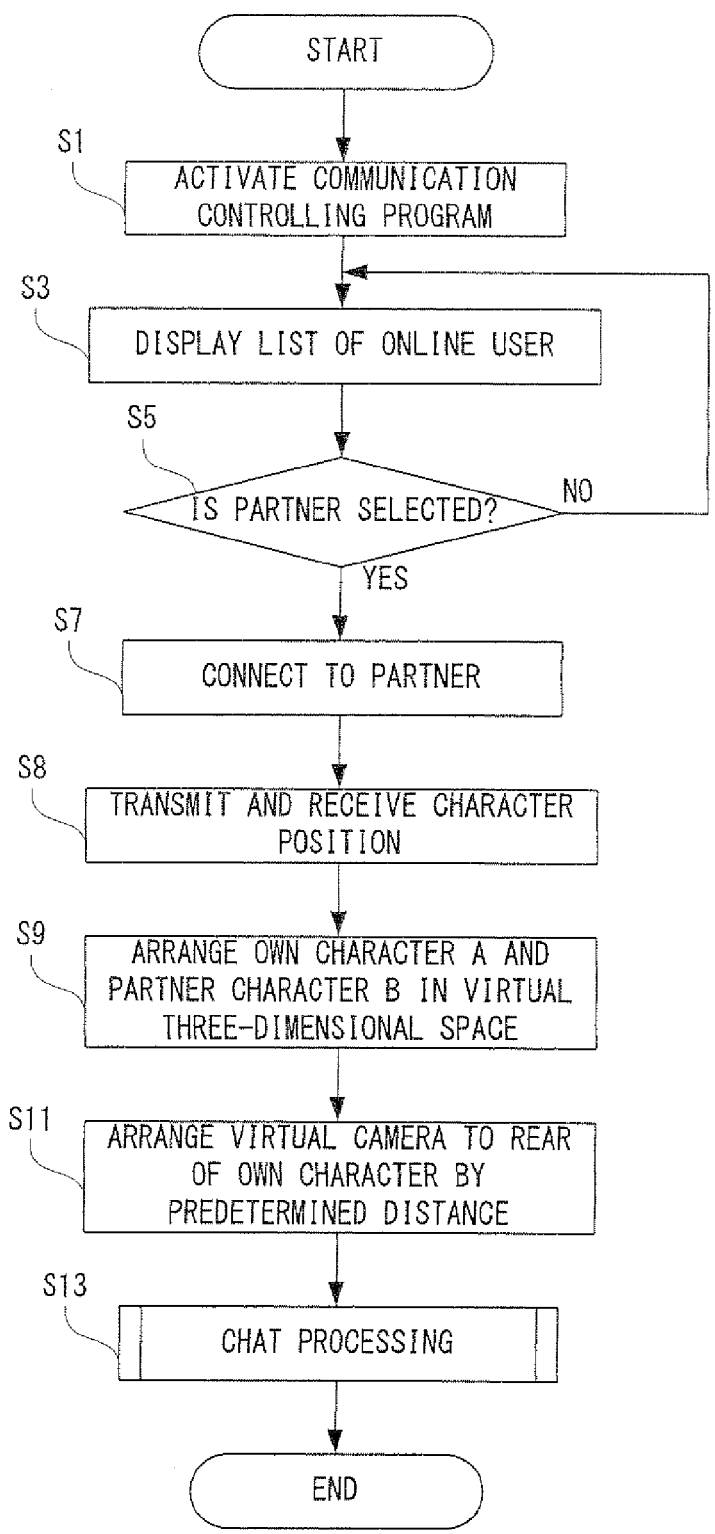
FIG. 17 is a flowchart showing a part of an operation of the CPU.

The CPU 40 executes processing according to the flowcharts shown in FIG. 17-FIG. 21 on the basis of the program and the data shown in the memory map in FIG. 16. Referring to FIG. 17, when the "underwater swimming game" is started, the CPU 40 first activates the communication controlling program 204 in a step S1. In a step S3, by utilizing the communication controlling program 204, the list of the online user (not illustrated) representing a online situation of the respective users registered in advance in the game apparatus 12 (not illustrated) is acquired from the server 124, and is displayed on the monitor 34. In a step S5, it is determined whether or not the user selects a partner from the list, and if "ND", the process returns to the step S3. When an operation of selecting any one of the online users from the screen is performed with the controller 22, "YES" is determined in the step S5, and the process proceeds to a step S7. In the step S7, the game apparatus 12 (CPU 40 itself) is connected to the game apparatus (12) of the partner via the network 122. Thus, when a data (audio data and position data, etc.) exchangeable state between the game apparatus 12 and the game apparatus (12) of the partner is brought, the process proceeds to a step S8 to transmit and receive the position data. That is, the position data of the own character A stored in the transmission data area 214 is transmitted to the game apparatus (12) of the partner while the position data of the partner character B is received from the game apparatus (12) of the partner and written to the reception data area 212.

In a step S9, the own character A and the partner character B are arranged within the virtual space on the basis of the position data of the transmission data area 214 and the position data of the reception data area 212, and in a step S11, the virtual camera VC is arranged to the rear of the own character A by a predetermined distance, and in a step S13, chat processing (described later) is executed while data exchange is performed with the game apparatus (12) of the partner. It should be noted that the information (preset data) indicating an initial position and a predetermined distance of each character A, B is stored in the data area 210 although omitted in. FIG. 16. After completion of the chat processing, the "underwater swimming game" is ended.

Noted that, in this embodiment, after the connection is established, the position of the own character is notified with the partner, and the own character A is arranged at the notifying position, and the partner character B is arranged at the notified position (S8-S9), but in another embodiment, the own character A and the partner character B may be respectively arranged at a first initial position and a second initial position. Here, the first initial position is a position the same as the initial position in a stand-alone (1P) mode, for example, and the second initial position is a position opposed to the first initial position, for example. Accordingly, with respect to the game apparatus 12 of the user, that is, the master device, the own character A is arranged in the first initial position, and the partner character B is arranged in the second initial position, and with respect to the game apparatus (12) of the partner, that is, the slave device, the own character A is arranged in the second initial position, and the partner character B is arranged in the first initial position. The data indicating each initial position is stored in the data memory area 210.

Furthermore, in a case that N players (N is an integer equal to or more than 3) hold chat, the own character A may be arranged in the first initial position, and the first partner character B may be arranged in the second initial position , . . . , and an (N−1)-th partner character may be arranged in an N-th initial position. The first initial position is a position the same as the initial position in a stand-alone (1P) mode, and the second-the N-th initial positions are arranged so as to surround the first initial position, for example.

Figure 18:
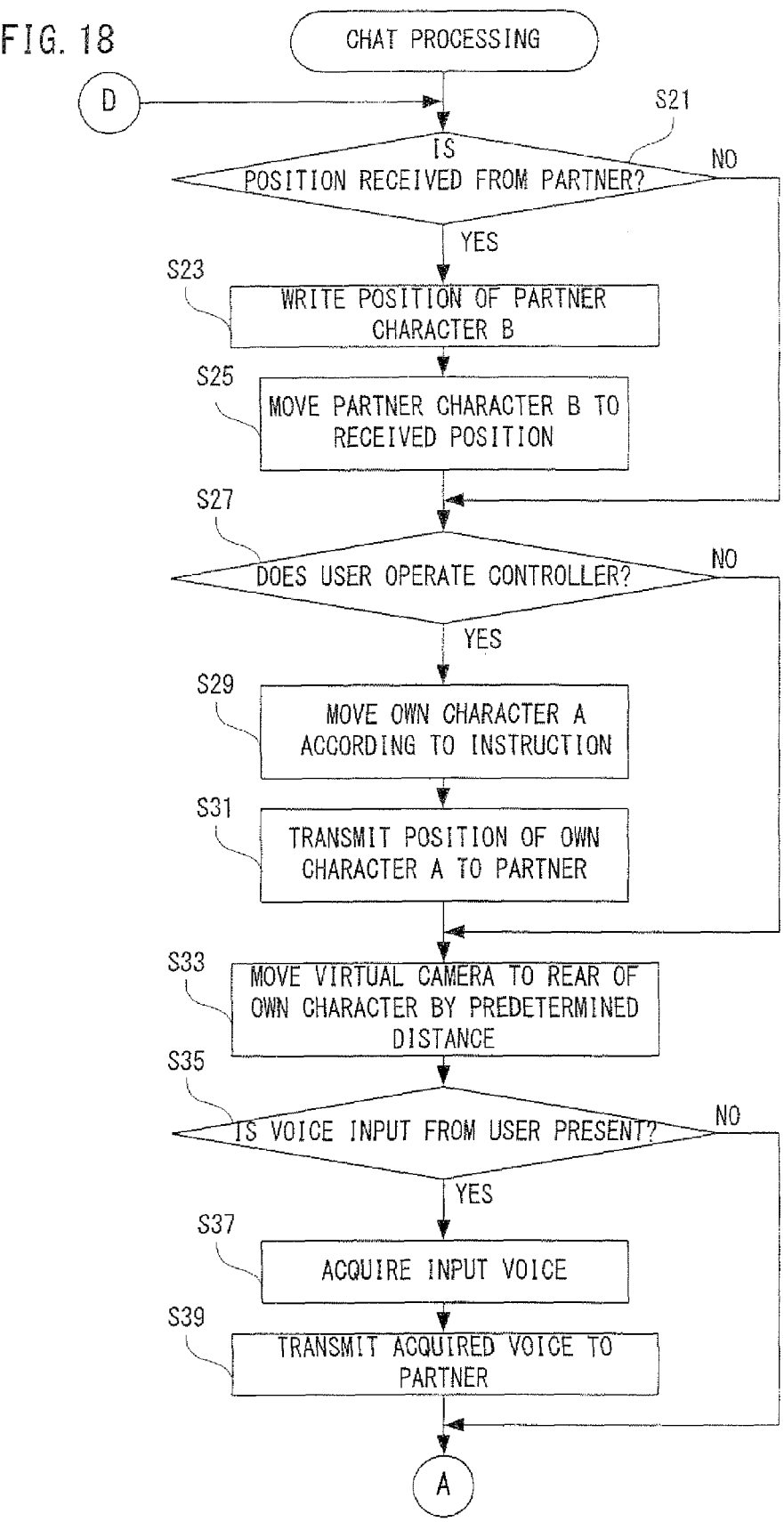
FIG. 18 is a flowchart showing another part of the operation of the CPU.
Figure 19:
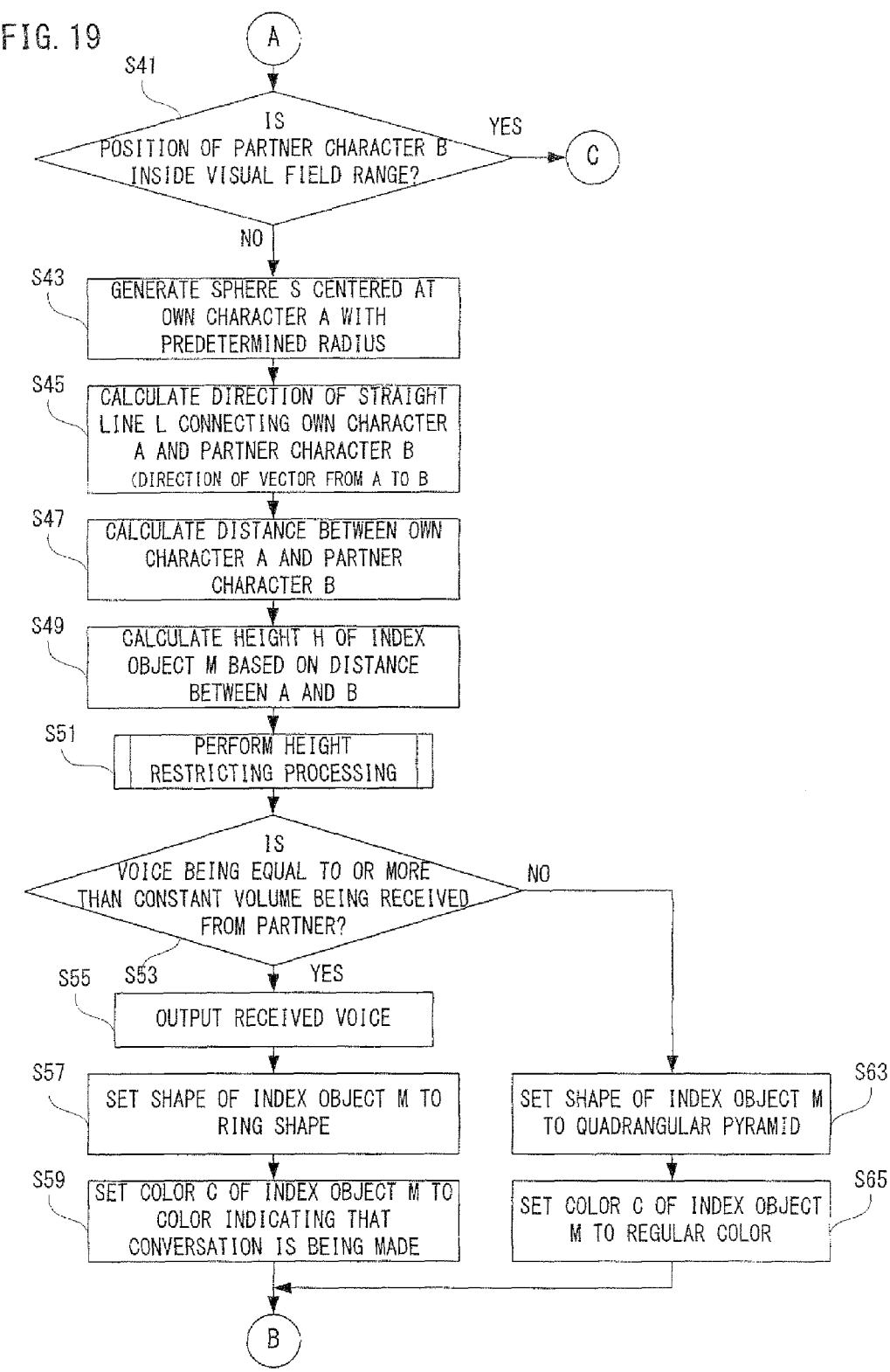
FIG. 19 is a flowchart showing a still another part of the operation of the CPU.
Figure 20:
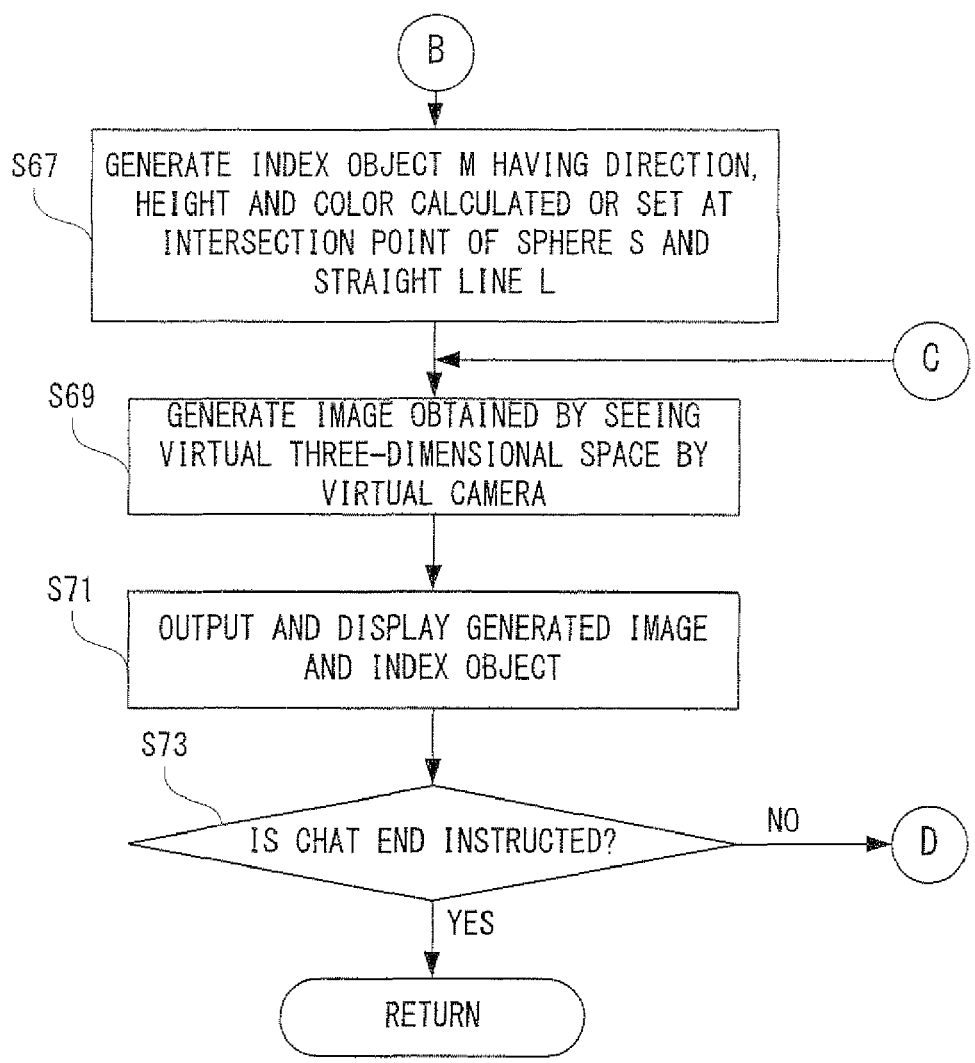
FIG. 20 is a flowchart showing a further part of the operation of the CPU.

The chat processing in the aforementioned step S13 is executed according to a subroutine of a flowchart in FIG. 18-FIG. 20. Here, the subroutine (S21-S75) is executed at a predetermined cycle (for each frame, for example). Referring to FIG. 18, in a step S21, it is determined whether or not a position is received from the partner on the basis of a notification from the communication controlling program 204, and if "NO", the process proceeds to a step S27. When the notification of the position reception is received from the communication controlling program 204, "YES" is determined in the step S21, and the process proceeds to the step S27 through steps S23 and 525. In the step S23, the received position, that is, the new position of the partner character B is written in the reception data area 212, and in the step S25, the partner character B is moved to the new position within the virtual space.

In the step S27, it is determined whether or not the user operates the controller 22, and if "NO", the process proceeds to a step S33. If "YES" in the step S27, the process proceeds to the step S33 through steps S29 and S31. In the step S29, the own character A is moved within the virtual space according to an instruction by an operation, and in the step S31, the new position of the own character A is written to the transmission data area 214 so as to be transmitted to the partner by utilizing the communication controlling program 204. In the step S33, the virtual camera VC is moved to a reward position from the own character A by a predetermined distance.

In a step S35, it is determined whether or not a sound input from the user is present, and if "NO", the process proceeds to a step S41. If "YES" in the step S35, the process proceeds to the step S41 through steps S37 and S39. In the step S37, an input voice is acquired from the sound input device 36, and in the step S39, the acquired voice, that is, the voice of the user is written to the transmission data area 214, and transmitted to the partner by utilizing the communication controlling program 204.

In the step S41, it is determined whether or not the position of the partner character B is inside the visual field range E (see FIG. 22) of the own character A (including the boundary surface) on the basis of the information of the reception data area 212 (position of the partner character B) and the information of the visual field range information area 217, and if "YES", the process proceeds to a step S69 (described later). If the partner character B is outside the visual field range E, "NO" is determined in the step S41, and the process proceeds to a step S43. Here, the boundary surface may be included in the outside the visual field range E.

In the step S43, the sphere S centered at the character A with predetermined radius is generated within the virtual space (see FIG. 10: described above). In a step 545, the direction (direction of the vector from A to B) of the straight line L connecting the own character A and the partner character B is calculated, and the calculation result is written to the straight line information area 220. In a step S47, the distance between the own character A and the partner character B (size of the vector from A to B) is calculated, and the calculation result is written to the straight line information area 220. In a step S49, the height of the index object M (FL see FIG. 12-FIG. 15) is calculated on the basis of the calculated distance, and the calculation result is written to the index object information area 222. In a step S51, restricting processing (see FIG. 21: described later) is performed on the calculated height H. The height restricting processing is executed according to the subroutine in FIG. 21.

Figure 21:
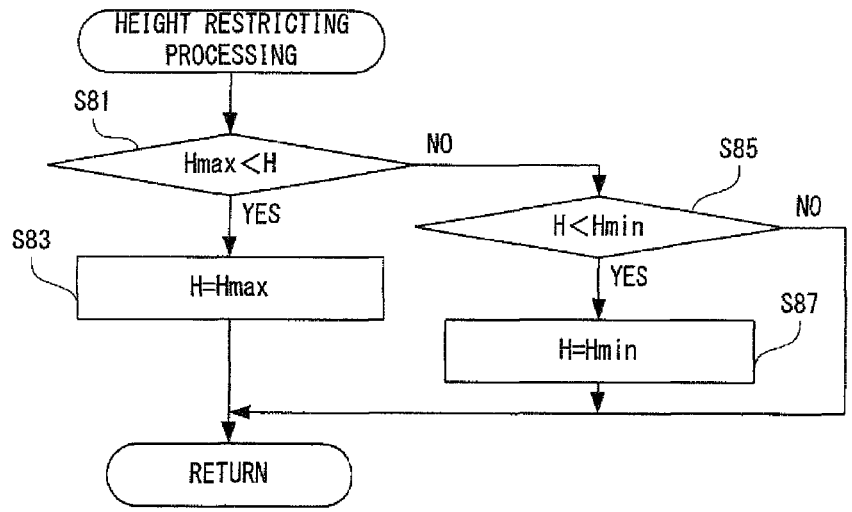
FIG. 21 is a flowchart showing a still further part of the operation of the CPU.

Referring to FIG. 21, in a step S81, it is determined whether or not the height H is larger than a maximum value Hmax decided in advance, and if "YES", that is, if Hmax<H, H=Hmax in a step S83, and then, the process returns to the routine at hierarchical upper level. If "NO" in the step S81, that is, if Hmax≧H, the process proceeds to a step S85. In the step S85, it is determined whether or not the height H is smaller than a minimum value Hmin decided in advance, and if "YES", that is, if H<Hmin, H=Hmin in a step S87, and the process returns to the routine at the hierarchical upper level. If "NO" in the step S85, that is, if H≧Hmin, the calculated height H is within a fixed range, and therefore, the process directly returns to the routine at the hierarchical upper level without performing the height restricting processing. This makes it possible to restrict the height H within the fixed range (Hmin≦H≦Hmax), and ensure viewability of the screen with the index object M displayed.

Referring to FIG. 19 again, in a step S53, it is determined whether or not a voice equal to or more than a constant volume is being received from the partner on the basis of the information (voice of the partner) of the reception data area 212. If "YES" here, the process proceeds to a step S67 through steps S55-S59, and if "NO", the process proceeds to the step S67 through steps S63-S65.

In the step S55, the received voice, that is, the speech sound of the partner is output from the speaker 34a. In the step S57, the shape of the index object M is set to the shape being made up of rings, and the set result is written to the index object information area 222. In the step S59, the color of the index object M is set to the color indicating that a conversation (red, for example) is being made, and the set result is written to the index object information area 222.

In the step S63, the shape of the index object M is set to the quadrangular pyramid, and the set result is written to the index object information area 222. In the step S65, the color of the index object M is set to a normal color (blue, for example), and the set result is written to the index object information area 222.

Referring to FIG. 20, in the step S67, on the basis of the information of the index object information area 222, the index object M is generated in the virtual space. The index object M has a direction, a height, a shape and a color calculated or set as described above, and is arranged in such a position that the tip (vertex of the cone C and the quadrangular pyramid) is inscribed with the surface of the sphere S at the position of the intersection point of the surface of the sphere S and the straight line L (see FIG. 10). In a step S69, an image seeing the virtual space from the virtual camera VC is generated, and in a step S71, the image thus generated and the index object M are output to the monitor 34.

By such processing, when the partner character B is outside the visual field range E of the own character A, the game screen shown in FIG. 12-FIG. 15 is displayed on the monitor 34 as a result. The index object M within the game screen indicates a direction in which the partner character B exists and a distance to the partner character B by the direction of the vertex and the height H. The index object M also represents whether the partner is making a speech by the shape and color. The index object M represented by a blue quadrangular pyramid as shown in FIG. 12-FIG. 13 indicates that the partner is not making a speech, and the index object M shown by red rings as shown in FIG. 14-FIG. 15 indicates that the partner is making a speech. Although illustration is omitted, when the partner character B is inside the visual field range of the own character A, the index object M is undisplayed (that is, erased from the game screen).

Then, it is determined whether or not a chat end is instructed in a step S73, and if "NO", the process returns to the step S21 to repeat similar processing. If "YES" in the step S73, the process returns to the routine at a hierarchical upper level.

As understood from the above description, the game apparatus 12 (CPU 40) in this embodiment specifies the game apparatus (12) of the partner with which chat is done (S3, S5), and transmits and receives messages with the game apparatus (12) of the partner (S1, S35-S39, S53-S55, 204). Furthermore, the own character A corresponding to the player and the partner character 13 corresponding to the game apparatus of the partner are arranged within the virtual space (S9), an image seeing the virtual space from an arbitrary position is generated (S69), a direction from the own character A to the partner character B is calculated (S45), it is determined whether or not the partner character B is included in the predetermined range E defined in the vicinity of the own character A (S41), and if it is determined that the partner character B is not included (out of the predetermined range), the index object M indicating the calculated direction is generated (S67). The generated image and index object M are output to the monitor 34 (S71). Thus, it is possible to inform where the character corresponding to the chatting partner is even if it extends off the visual field range.

The game apparatus 12 further determines whether or not the message is being received (S53), and when it is determined that a message is being received, the manner of the index generated as described above is changed. Thus, even if the partner character extends off the screen, it is possible to easily inform whether or not the partner is making a speech as well as in which direction the partner character is.

Additionally, in the aforementioned embodiment, the index object M is constantly displayed so long as the partner character B is outside the visual field range E, but in another embodiment, the index object M may be displayed only when the partner makes a speech in a state that the partner character B is outside the visual field range E. Such embodiment is explained next.

(Another Embodiment)

The hardware configuration of this embodiment is common to the aforementioned embodiment (see FIG. 1-FIG. 9) and the software configuration may be basically common thereto (FIG. 16-FIG. 21).

However, a part of the game program 202 (chat processing) is changed as follows. That is, in the chat processing shown in FIG. 18-FIG. 21, a part of the steps S41-S71 is replaced with steps S41a-S65a shown in FIG. 23-FIG. 24. Accordingly, in FIG. 23-FIG. 24, processing sequel to the step S39 in FIG. 18 is shown. Furthermore, the shape and color stored in the index object area 222 are variables in the above-described embodiment, but they may be constant here because whether or not a speech is making is not required to show by a shape and a color.

Figure 23:
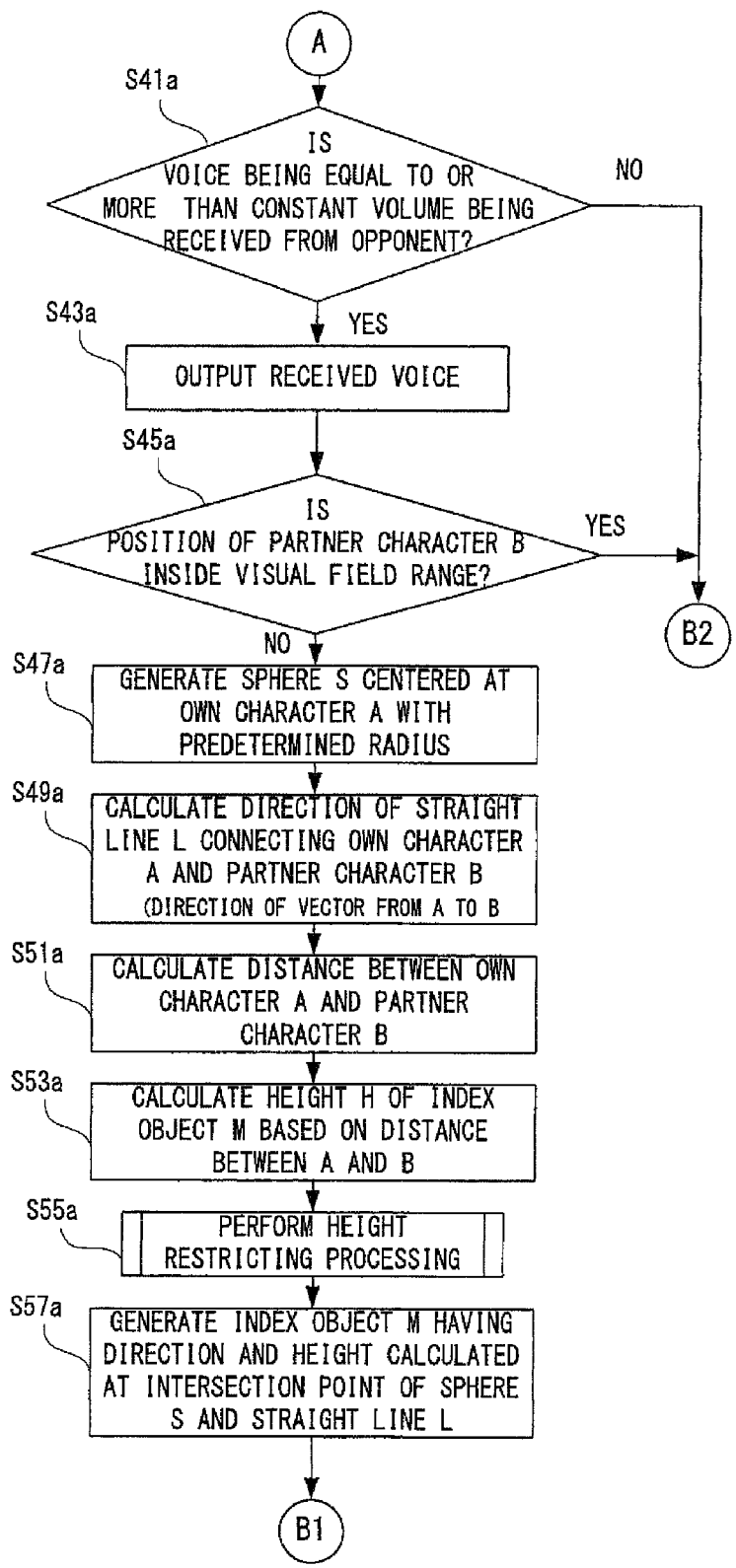
FIG. 23 is a flowchart showing a part of an operation of the CPU of another embodiment.
Figure 24:
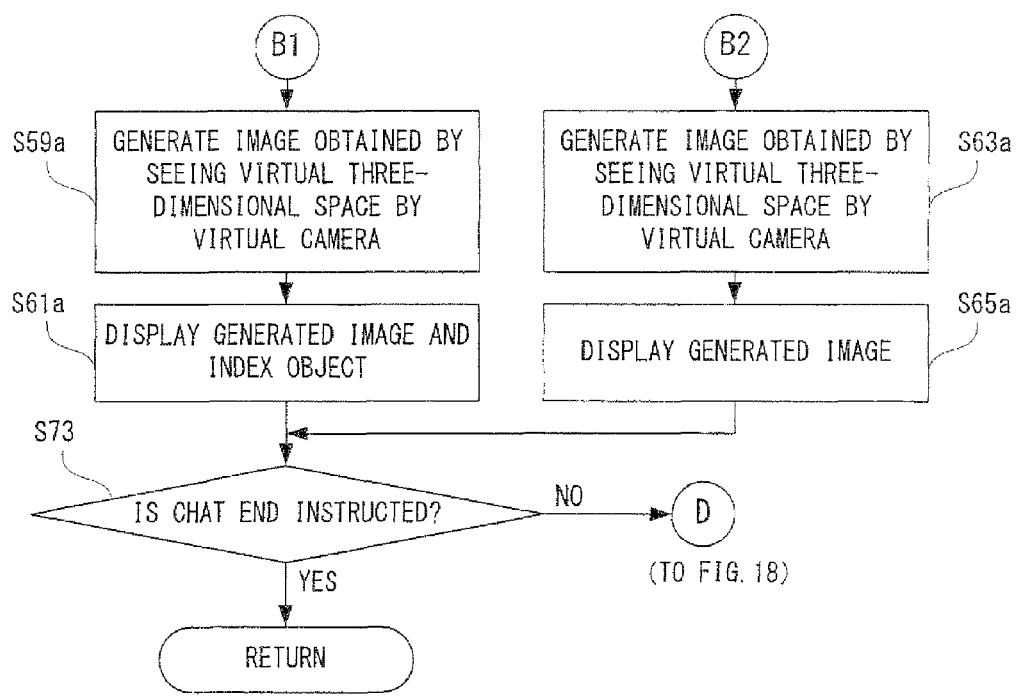
FIG. 24 is a flowchart showing another part of the operation of the CPU of another embodiment.

Referring to FIG. 23-FIG. 24, the CPU 40 executes processing similar to the step S53 in FIG. 19 in the first step S41a. That is, it is determined whether or not a voice equal to or more than a constant volume is being received from the partner on the basis of the information of the reception data area 212 (voice of the partner). If "YES" here, that is, if a voice equal to or more than a constant volume is being received, the process proceeds to a step S73 via the steps S43a-S61a. On the other hand, if "NO" in the step S41a, that is, if no voice is received or if the voice is less than the constant volume, even if the voice is being received from the partner, the process proceeds to the step S73 via the steps S63a-S65a.

First, if "YES" in the step S41a, the received voice, that is, the speech voice from the partner is output from the speaker 34a in the step S43a. Then, in the step S45a, processing similar to the step S41 in FIG. 19 is executed. That is, on the basis of the information of the reception data area 212 (the position of the partner character B) and the information of the visual field range information area 217, it is determined whether or not the position of the partner character B is inside the visual field range E of the own character A (see FIG. 22), and if "YES", the process proceeds to the step S63a (described later). If the partner character B is outside the visual field range E, "NO" is determined in the step S45a, and then, the process proceeds to the step S47a.

In the steps S47a-S49a, processing similar to the steps S43-S45 in FIG. 19 is executed. That is, in the step S47a, the sphere S centered at the character A with predetermined radius is generated within the virtual space (see FIG. 10: described above). In the step S49a, the direction of the straight line L connecting the own character A and the partner character B (direction of the vector from A to B) is calculated, and the calculation result is written to the straight line information area 220.

In the steps S51a-S55a, processing similar to the steps S47-S51 in FIG. 19 is executed. That is, in the step S51a, the distance between the own character A and the partner character B (size of the vector from A to B) is calculated, and the calculation result is written to the straight line information area 220. In the step S53a, the height of the index object M (H: see FIG. 12-FIG. 15) is calculated on the basis of the calculated distance, and the calculation result is written to the index object information area 222. In the step S55a, restricting processing is performed on the calculated height H. The height restricting processing is also executed according to the subroutine in FIG. 21

In the step S57a, the index object M is generated in the virtual space on the basis of the information of the index object information area 222. The index object M has a direction and a height calculated as described above, and is arranged in such a position that the tip (vertex of the cone C and the quadrangular pyramid) is inscribed with the surface of the sphere S at the position of the intersection point of the surface of the sphere S and the straight line L (see FIG. 10). With respect to the shape and the color of the index object M, the shape and the color decided in advance are adopted. In the step S59a, an image seeing the virtual space from the virtual camera VC is generated, and in the step S61a, the image thus generated and the index object M are output and displayed to the monitor 34.

On the other hand, If "NO" in the step S41a, or if "YES" in the step S45a, an image seeing the virtual space from the virtual camera VC is generated in the step S63a, and in the step S65a, the image thus generated is output to the monitor 34. The index object M is not generated and displayed.

By such processing, the index object M can be displayed only when the partner makes a speech in a state that the partner character B is outside the visual field range E.

As understood from the above description, the game apparatus 12 (CPU 40) of this embodiment specifies the game apparatus (12) of the partner with which chat is done (S3, 55), and transmits and receives messages with the game apparatus (12) of the partner (S1, S35-S39, S41a-S43a, 204). The own character A corresponding to the player and the partner character B corresponding to the game apparatus of the partner are arranged within the virtual space (S9), an image seeing the virtual space from an arbitrary position is generated (S59a), a direction from the own character A to the partner character B is calculated (S49a), it is determined whether or not the partner character B is included in the predetermined range E defined in the vicinity of own character A (S45a), it is determined whether or not the message is being received (S41a), and if the partner character B is out of the predetermined range, and the message is being transmitted or received, the index object M indicating the calculated direction is generated (S57a). The generated image and the index object M are output to the monitor 34 (S61a, S65a). Thus, even if the character corresponding to the chatting partner is out of the visual field range while the chatting partner is making a speech, it is possible to inform which direction it is.

It should be noted that in the aforementioned embodiment or another embodiment ("embodiment" hereafter), a part of the element may be changed below. Some modified examples are explained next.

MODIFIED EXAMPLE

Each game apparatus 12 may be a hand-held game machine without being restricted to a console game machine. Generally, this may be an information processing apparatus, such as a game machine, a PC, a PDA, etc., and different kinds of the information processing apparatuses may be utilized between the transmitter and the receiver.

The relation between the plurality of game apparatuses 12, 12, . . . may be a server-client model without being restricted to a peer-to-peer network.

In this embodiment, a speech voice is transmitted and received, but a message other than the voice may be transmitted and received (chat, and so on by text).

In this embodiment, when the height (H) of the index object M is decided from the distance between the own character A and the partner character B, the upper limit (Hmax) and the lower limit (Hmin) are set, and the height H is set in proportion to the distance AB between these limits, but the method is not restricted thereto. For example, the upper limit and/or the lower limit may not be set, a non proportional arithmetic operation method may be used, and a method of gradually deciding the height (H) according to a table representing a correspondence between the distances and the heights may be adopted.

In this embodiment, the index object M is a quadrangular pyramid (see FIG. 12, FIG. 13), and a plurality of rings (see FIG. 14, FIG. 15) about the cone C, but any shape capable of indicating a direction (arrow, finger shape, etc.) may be applicable. Or, the direction can be displayed by the position of the index object M (the vector from the own character A to the index object M indicates a position of the partner character B), and in this case, the index object M need not to take a shape having a directional property. That is, this may be merely a circle, a sphere, a cube, and this may be an icon representing the partner character. On the contrary, in a case of the index object M capable of informing the direction by the shape, the position need not to be changed (a case that an arrow is constantly above the own character, and directed to the direction of the partner character, for example). Briefly speaking, in this embodiment, the direction is indicated by both of the position and shape, but the direction may be indicated by any one of them.

In this embodiment, whether or not a speech is being made is determined on the basis of the volume, but the fact that a speech is being made is determined on the basis of a state that a predetermined button is pushed (a state that the A button 26*d* of the controller 22 is pushed, for example) like a transceiver. In the case of a text chat, such a determination can be made on the basis of the presence or absence of the instruction for speech (transmitting and receiving of messages, display, etc.). For example, several seconds after reception of an instruction for transmitting and receiving and displaying, etc. determine that a speech is being made. Alternatively, the time from the start of displaying the transmitted and received text to the end thereof may determine that a speech is being made.

In this embodiment, depending on the distance to the partner character B, the height H of the index object M is changed, but in place of this, or in addition thereto, an area, a volume, a length other than the height (a circumference of a ring, a depth of the quadrangular pyramid, etc.) may be changed. Or, in place of or in addition to the size of the index object M being changed, a shape, a color, brightness, shades of color, blinking cycles, etc. may be changed depending on the distance. In brief, if the display manner of the index object M is changed depending on the distance to the partner character B, it becomes possible to grasp the distance.

The index object M may be displayed while a voice of the user himself or herself is being transmitted as well as while a voice from the partner is being received. That is, the index object M may be displayed irrespective of which player makes a speech, the user or the partner. In such a case, the direction of the index object M may be changed in order to show which player make a speech, the user or the partner. Alternatively, even if the partner makes a speech, the index object M is not displayed, and only when the user makes a speech, the index object M may be displayed.

In this embodiment, the two players make conversations, but this can be applied to conversations among three or more players. In this case, since a plurality of partner character B appear, index objects M as many as the players are generated and preferably displayed in a manner different from each other (different colors, for example). Furthermore, a partner for whom the index object M is displayed and a partner for whom the index object M is not displayed may be selectable. Furthermore, the index object M is displayed as to only the partner with whom chat is done, and the index object M is not displayed as to the partner with whom chat is not done, or all the index objects M are constantly displayed, and their display manner may be changed depending on whether the partner is chatting or not.

In this embodiment, a voice is transmitted irrespective of the presence or absence of an input being equal to or more than a predetermined volume at transmission, and at the receiver, depending on whether or not a voice being equal to or more than the predetermined volume is present, the presence or absence of a voice input is determined. However, a volume is checked at transmission, and only when a voice is equal to or more than the predetermined volume, the voice is transmitted, and at the receiver, when the data is received, the fact that a voice input is present may be determined. In brief, processing of determining the presence or absence a voice input based on a threshold value of the volume may be performed at any one of the transmitter and at the receiver.

In this embodiment, the sphere S has a predetermined radius, but the radius may be dynamically changed such that the sphere S is sure to enter the screen. For example, the shortest distance from the own character A to the outline of the screen is calculated, and the radius of the sphere S is set to be made shorter than the shortest distance. This makes it possible to make the index object M surely enter the screen, capable of surely informing the user of the direction of the partner character B.

In this embodiment, the sphere S and the straight line L are set to nondisplay, but one of them or both of them may be displayed. The display/non-display may be switched by an operation of the controller 22.

In this embodiment, the display/non-display of the index object M is determined whether or not the position of the partner character B is inside the visual field range E (see FIG. 22) (S41, S45*a*), but this may be determined whether or not another object B is included in a current or past images (several frames before) of the range imaged by the virtual camera VC.

Additionally, in a case of the embodiment, even if the partner character B is straight in front of the own character A, if the distance from the own character A is far, the partner character B is not included in the visual field range E, so that the index object M is displayed. Moreover, when the partner character B is in proximity to the own character A but is out of view due to a wall, the partner character B is included in the visual field range E, so that the index object M is not displayed. On the contrary thereto, in a case that the display/non-display of the index object M is determined depending on whether or not another object B is included in the image imaged by the virtual camera VC, when the partner character B is straight in front of the own character A, the partner character B is included in the image even if the distance from the own character A is far, so that the index object M is not displayed. Furthermore, when the partner character B is out of view due to the wall, the partner character B is not included in the image, so that the index object M is displayed.

Additionally, there is a method of making the determination by performing a glance check. For example, the own character A throws a glance for each frame (or at regular intervals), and the determination is made depending on whether or not the glance collides with the partner character B. Thus, in a case that the determination is made depending on whether the partner character B is included within the arrival range of the glance from the own character A as well, if the partner is straight in front of the own character A, the index object M is not displayed, and if the partner is out of view due to the wall, the index object M is displayed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A network system for enabling chat among a plurality of information processing apparatuses via a network, wherein each information processing apparatus comprises:
    chatting partner specifying circuitry configured to specify an information processing apparatus of a chat partner,
    a message transmitter and receiver configured to transmit and receive a message between a user's own information processing apparatus and said information processing apparatus of the chat partner specified by said chatting partner specifying circuitry,
    character arranging circuitry configured to arrange a character corresponding to said user's own information processing apparatus and a partner character corresponding to said information processing apparatus of the chat partner within a virtual space,
    image generating circuitry configured to generate an image obtained by viewing said virtual space from an arbitrary position,
    direction calculating circuitry configured to calculate a direction from said character to said partner character,
    index generating circuitry configured to generate an index which indicates the direction calculated by said direction calculating circuitry,
    partner character determining circuitry configured to determine whether said partner character is included in a predetermined range defined within said virtual space,
    transmission and reception determining circuitry configured to determine whether a message is being transmitted or received by said message transmitter and receiver, and
    display outputting circuitry configured to output the image generated by said image generating circuitry to a display, wherein
    said display outputting circuitry outputs the index generated by said index generating circuitry to said display in a predetermined manner when said partner character determining circuitry determines that said partner character is not included in said predetermined range, and said transmission and reception determining circuitry determines that a message is being transmitted or received.

2. A network system according to claim 1, wherein said index generating circuitry generates said index in a first manner when said partner character determining circuitry determines that said partner character is not included in said predetermined range, and said transmission and reception determining circuitry determines that a message is not being transmitted or received; and said index generating circuitry generates said index in a second manner when said partner character determining circuitry determines that said partner character is not included in said predetermined range, and said transmission and reception determining circuitry determines that a message is being transmitted or received.

3. A network system according to claim 1, wherein said message is audio data,
    said transmission and reception determining circuitry determines that a message is being transmitted or received when an amplitude of the audio data transmitted or received by said message transmitter and receiver is equal to or more than a predetermined value, and determines that a message is not being transmitted or received when an amplitude of the audio data transmitted or received by said message transmitter and receiver is less than said predetermined value.

4. A network system according to claim 1, wherein each information processing apparatus further comprises sphere generating circuitry configured to generate a sphere centered at said character with a predetermined size,
    said direction calculating circuitry generates a line connecting said character and said partner character, and
    said index generating circuitry generates said index at an intersection point of a surface of said sphere and said line.

5. A network system according to claim 1, wherein each information processing apparatus further comprises distance calculating circuitry configured to calculate a distance between said character and said partner character, and
    said index generating circuitry changes the manner of said index based on the distance calculated by said distance calculating circuitry.

6. A network system according to claim 5, wherein said manner includes a size.

7. A network system according to claim 6, wherein said index generating circuitry generates said index so as to be larger in proportion to said distance.

8. A network system according to claim 6, wherein a maximum value and a minimum value of the size are set to said index, and
    said index generating circuitry generates an index of a size corresponding to said maximum value if said distance is equal to or more than a first set value, and generates an index of a size corresponding to said minimum value if said distance is equal to or less than a second set value.

9. A network system according to claim 1, wherein said index generating circuitry generates an index having a shape indicating the direction calculated by said direction calculating circuitry.

10. A network system according to claim 1, wherein said index generating circuitry generates an index at a position indicating the direction calculated by said direction calculating circuitry.

11. An information processing apparatus for enabling chat via a network, comprising:
    a processor;
    a memory coupled to said processor, said memory storing instructions that, when executed by said processor, control said processor to:
    specify an information processing apparatus of a chat partner,
    transmit and receive a message between a user's own information processing apparatus and said information processing apparatus of the specified chat partner,
    arrange a character corresponding to said user's own information processing apparatus and a partner character corresponding to said information processing apparatus of the chat partner within a virtual space, generate an image obtained by viewing said virtual space from an arbitrary position, calculate a direction from said character to said partner character, generate an index that indicates the calculated direction from said character to said partner character, determine whether said partner character is included in a predetermined range defined within said virtual space, determine whether a message is being transmitted or received, and output the generated image to a display, wherein the generated index is output to said display in a predetermined manner when it is determined that said partner character is not included in said predetermined range, and is determined that a message is being transmitted or received.

12. A non-transitory storage medium storing an information processing program, wherein said information processing program causes a computer of an information processing apparatus enabling chat via a network to execute:

specifying an information processing apparatus of a chat partner, transmitting and receiving a message between a user's own information processing apparatus and said information processing apparatus of the specified chat partner, arranging a character corresponding to said user's own information processing apparatus and a partner character corresponding to said information processing apparatus of the chat partner within a virtual space, generating an image obtained by viewing said virtual space from an arbitrary position, calculating a direction from said character to said partner character, generating an index which indicates the calculated direction, determining whether or not said partner character is included in a predetermined range defined within said virtual space, determining whether or not a message is being transmitted or received, and outputting the generated image to a display, wherein the generated index is output to said display in a predetermined manner when it is determined that said partner character is not included in said predetermined range, and it is determined that a message is being transmitted or received.

13. A method of facilitating chat among a plurality of information processing apparatuses via a network comprising:

specifying an information processing apparatus of a chat partner, transmitting and receiving a message between a user's own information processing apparatus and said information processing apparatus of the specified chat partner, arranging a character corresponding to said user's own information processing apparatus and a partner character corresponding to said information processing apparatus of the chat partner within a virtual space, generating an image obtained by viewing said virtual space from an arbitrary position, calculating a direction from said character to said partner character, generating an index which indicates the calculated direction, determining whether or not said partner character is included in a predetermined range defined within said virtual space, determining whether or not a message is being transmitted or received, and outputting the generated image to a display, wherein the generated index is output to said display in a predetermined manner when it is determined that said partner character is not included in said predetermined range, and it is determined that a message is being transmitted or received.

* * * * *